US010235816B2

(12) United States Patent
Dutta et al.

(10) Patent No.: US 10,235,816 B2
(45) Date of Patent: Mar. 19, 2019

(54) METHODS AND SYSTEMS FOR ELECTRONIC PAYMENT FOR PARKING IN GATED GARAGES

(71) Applicant: Transparent Wireless Systems, LLC, Vienna, VA (US)

(72) Inventors: Santanu Dutta, Vienna, VA (US); Nils Rydbeck, Summerland Key, FL (US)

(73) Assignee: Transparent Wireless Systems, LLC, Vienna, VA (US)

( * ) Notice: Subject to any disclaimer, the term of this patent is extended or adjusted under 35 U.S.C. 154(b) by 252 days.

(21) Appl. No.: 14/806,758

(22) Filed: Jul. 23, 2015

(65) Prior Publication Data
US 2015/0332517 A1 Nov. 19, 2015

Related U.S. Application Data

(63) Continuation of application No. 14/483,218, filed on Sep. 11, 2014, now Pat. No. 10,068,386, which is a (Continued)

(51) Int. Cl.
| | |
|---|---|
| *G07B 15/02* | (2011.01) |
| *G06Q 10/02* | (2012.01) |
| *G06Q 50/30* | (2012.01) |
| *G06Q 20/14* | (2012.01) |
| *G07F 17/24* | (2006.01) |

(Continued)

(52) U.S. Cl.
CPC ............ *G07B 15/02* (2013.01); *G06Q 10/02* (2013.01); *G06Q 20/145* (2013.01); *G06Q 20/3224* (2013.01); *G06Q 50/30* (2013.01); *G07B 15/04* (2013.01); *G07F 17/246* (2013.01)

(58) Field of Classification Search
CPC .............. G06Q 30/02; G06Q 30/0261; G06Q 30/0267; G06Q 30/0241; G06Q 50/01; G06Q 30/0601; G06Q 50/30; G06Q 20/20; G06Q 20/22; G06Q 20/32; G06Q 20/322; G06Q 20/3224; G06Q 30/00;
(Continued)

(56) References Cited

U.S. PATENT DOCUMENTS

| | | |
|---|---|---|
| 5,928,309 A | 7/1999 | Korver et al. |
| 6,081,206 A | 6/2000 | Kielland |

(Continued)

OTHER PUBLICATIONS

Vasilash, G. S. (2001). From opening garage doors a look at JCI's to implementing bluetooth: Electronics approach (engineer). Automotive Design & Production, 113(12), 42(1). Retrieved from https://dialog.proquest.com/professional/docview/677660071?accountid=142 (Year: 2001).*

(Continued)

*Primary Examiner* — Michael P Harrington
(74) *Attorney, Agent, or Firm* — The Marbury Law Group, PLLC

(57) ABSTRACT

The methods describe the use of Handset Apps in garages currently using paper tickets or ID tokens in ways that minimize disruption to the existing infrastructure. The techniques include automatic recognition of garage/gate ID, automatic identification of paper ticket ID without optical scanning, and direct payment in manually operated garages, including those using valet parking.

7 Claims, 29 Drawing Sheets

Related U.S. Application Data continuation-in-part of application No. 13/862,619, filed on Apr. 15, 2013, now Pat. No. 9,123,034.

(60) Provisional application No. 61/970,161, filed on Mar. 25, 2014, provisional application No. 61/888,793, filed on Oct. 9, 2013, provisional application No. 61/880,001, filed on Sep. 19, 2013, provisional application No. 61/687,333, filed on Apr. 23, 2012.

(51) Int. Cl.
*G06Q 20/32* (2012.01)
*G07B 15/04* (2006.01)

(58) Field of Classification Search
CPC .......... G06Q 30/0205; G06Q 30/0211; G06Q 30/06; G06Q 30/0251; H04W 64/00; H04W 4/02
See application file for complete search history.

(56) References Cited

U.S. PATENT DOCUMENTS

| | | | |
|---|---|---|---|
| 6,081,230 A | 6/2000 | Hoshino et al. | |
| 7,188,070 B2 | 3/2007 | Dar et al. | |
| 7,215,255 B2 | 5/2007 | Grush | |
| 7,908,149 B2 | 3/2011 | Dar et al. | |
| 8,131,596 B2 | 3/2012 | McQuilken | |
| 8,140,265 B2 | 3/2012 | Grush | |
| 8,175,886 B2 | 5/2012 | Odinak | |
| 9,159,080 B2* | 10/2015 | Fiorucci | G06Q 30/0226 |
| 2003/0146852 A1 | 8/2003 | O'Dell | |
| 2005/0286421 A1 | 12/2005 | Janacek | |
| 2006/0160521 A1* | 7/2006 | Foucher | G06Q 20/00 455/403 |
| 2007/0016362 A1 | 1/2007 | Nelson | |
| 2008/0117100 A1 | 5/2008 | Wang et al. | |
| 2009/0292597 A1 | 11/2009 | Schwartz et al. | |
| 2010/0090865 A1* | 4/2010 | Dasgupta | G08G 1/14 340/932.2 |
| 2011/0022427 A1* | 1/2011 | Dayan | G06Q 10/02 705/5 |
| 2011/0153367 A1 | 6/2011 | Amigo et al. | |
| 2011/0276430 A1* | 11/2011 | Vyas | G06Q 30/02 705/26.8 |
| 2012/0130777 A1 | 5/2012 | Kaufman | |
| 2012/0265434 A1* | 10/2012 | Woodard | G08G 1/147 701/423 |
| 2012/0308077 A1 | 12/2012 | Tseng | |
| 2014/0236686 A1 | 8/2014 | Grush et al. | |

OTHER PUBLICATIONS

Letter from Deeth Williams Wall, LLP; dated Jan. 5, 2015.
http://www.verrus.com/default.asp?ctState=prHow, Wireless Parking Payment, Apr. 10, 2013, webpage, 1pg.
http://us.parkmobile.com/members/, Mobile Payment Parking Solutions, Apr. 11, 2013, webpage, 1pg.
http://sfpark.org/, Apr. 11, 2013, 3pgs.
http://www.indiegogo.com/projects/sticknfind-bluetooth-powered-ultra-small-location-stickers, Ultra small sticker with Blue Tooth low energy, Apr. 11, 2013, 18pgs.
International Standard, ISO/IEC 18000-6, "Information Technology—Radio Frequency Identification for Item Management," First Edition, Aug. 15, 2004, copyright ISO/IEC 2004, 144pgs.

* cited by examiner

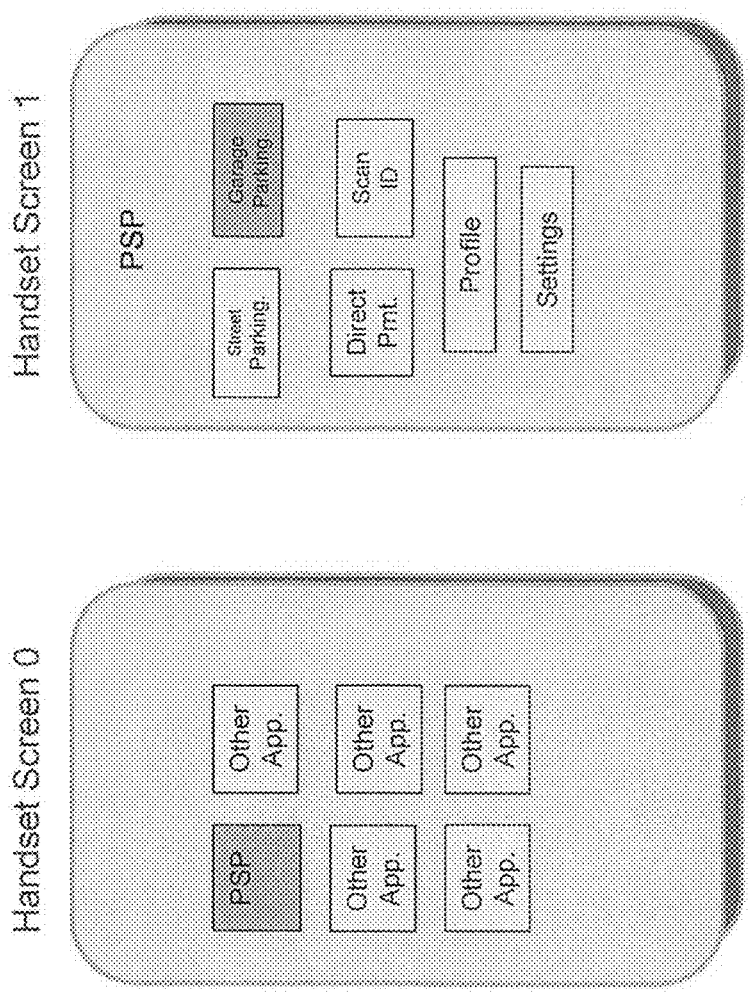

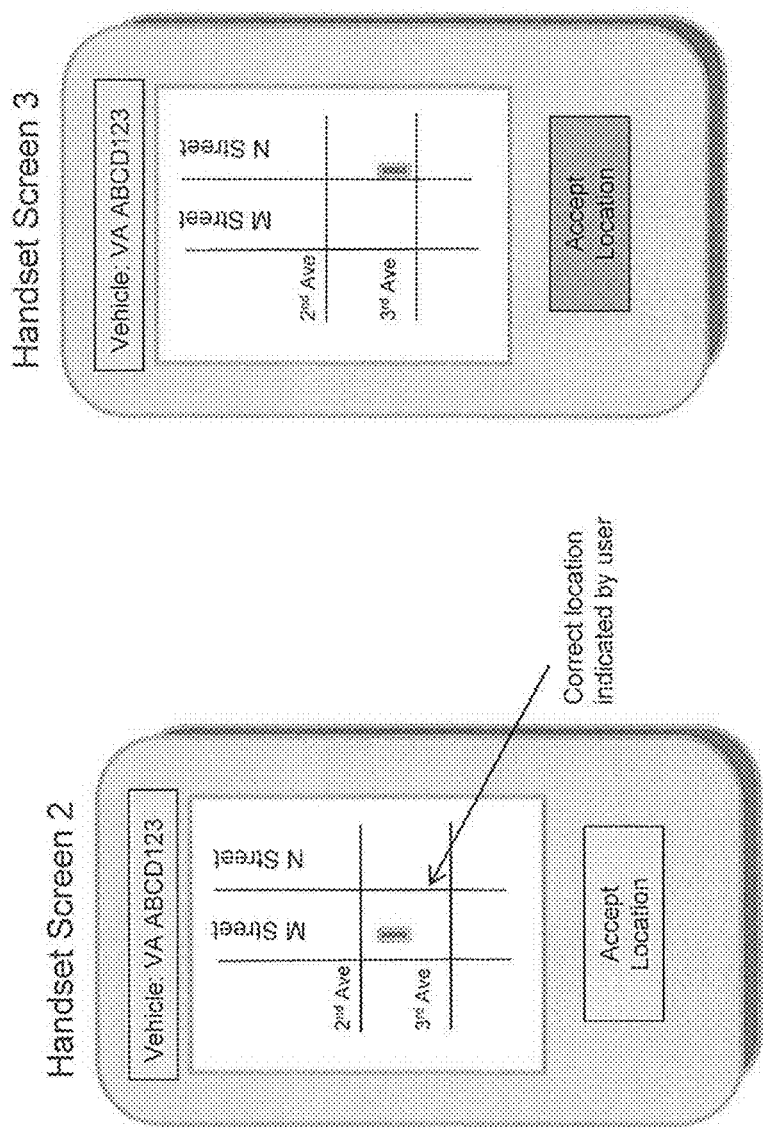

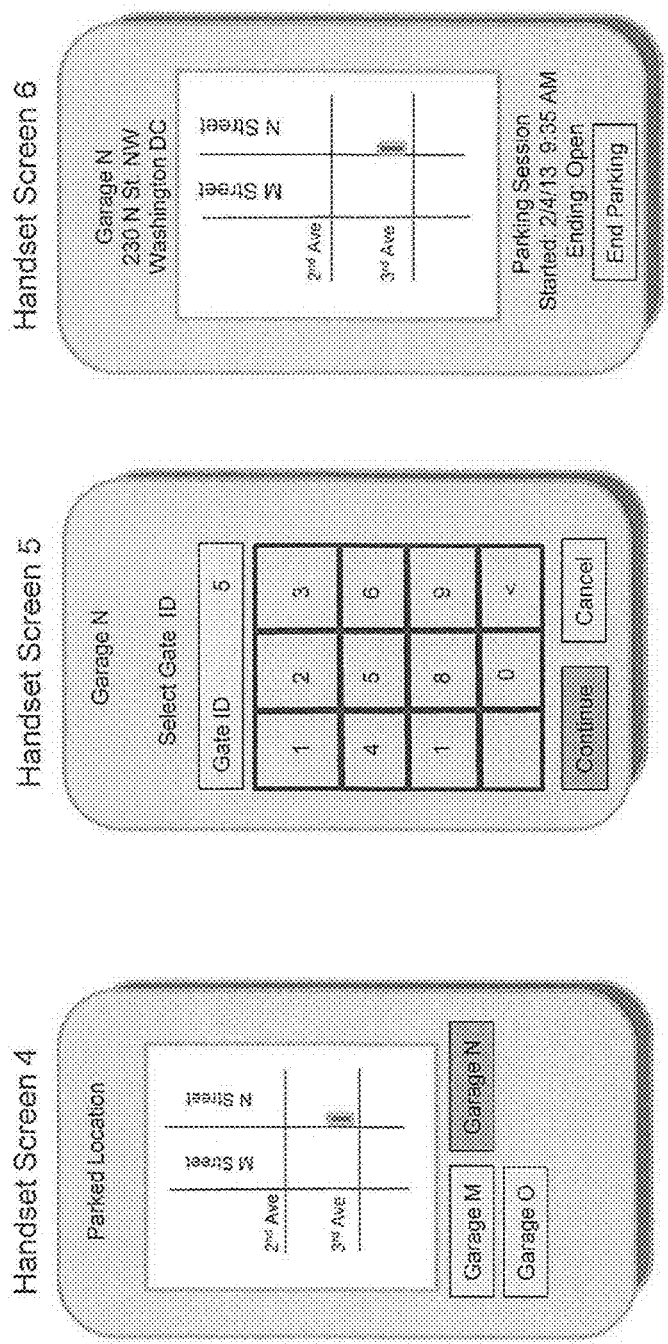

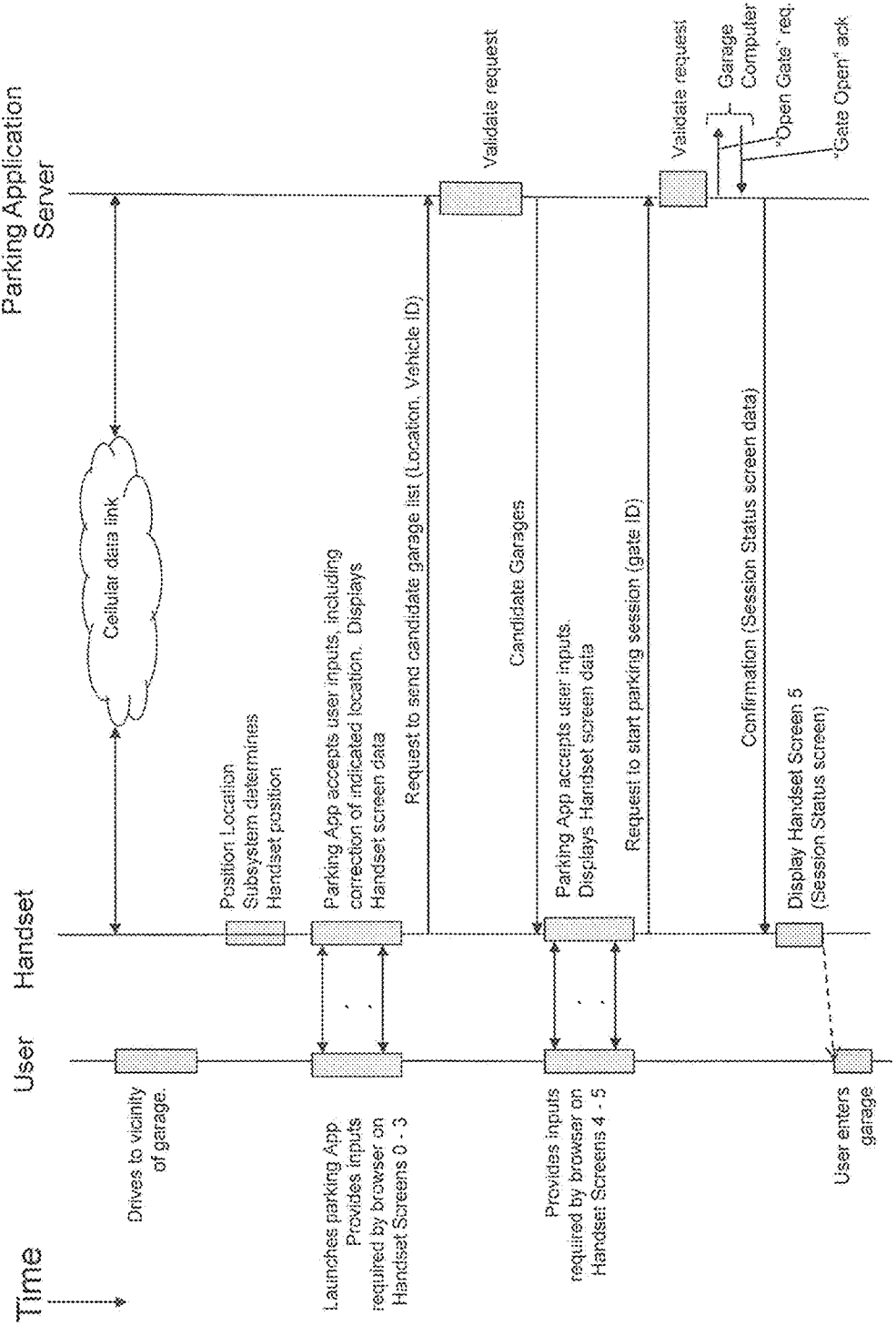
Fig. 1H Closed Garage Parking Transactions: Start Parking

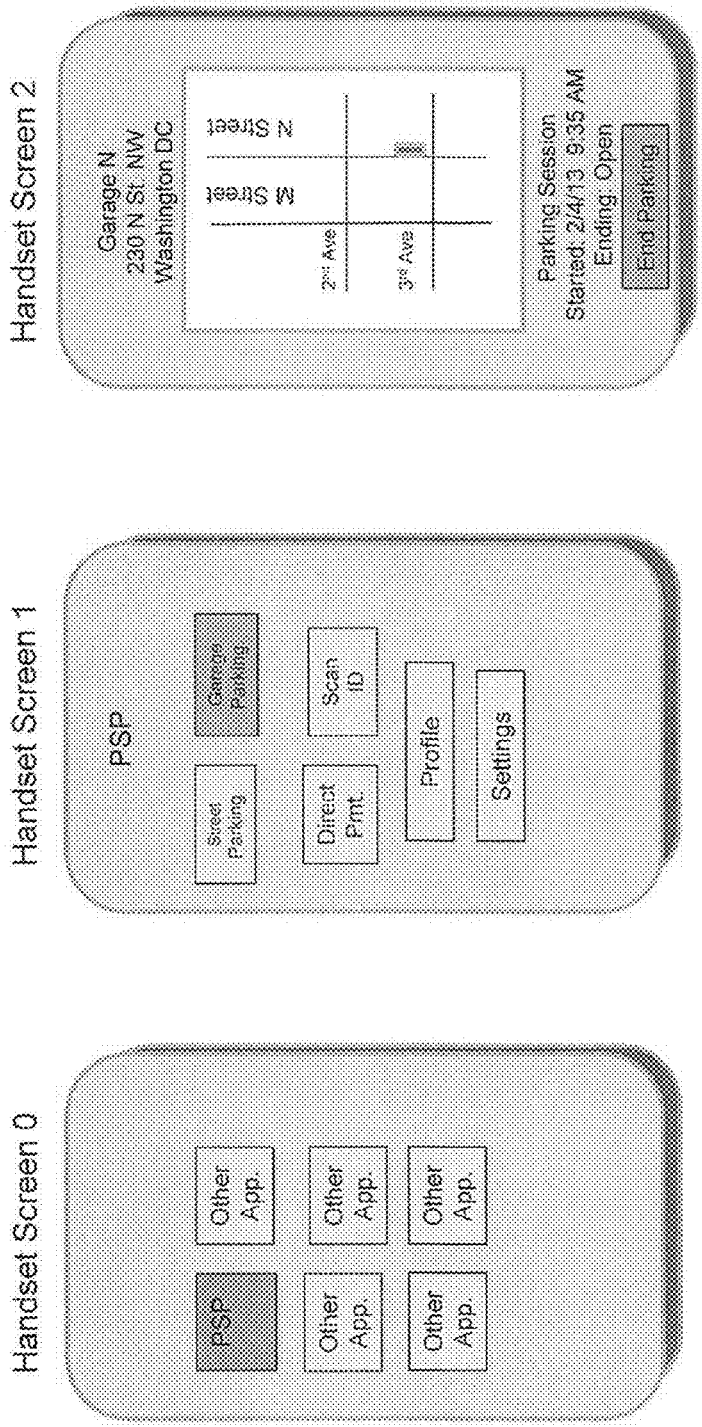

Closed Garage Parking Screens: End Parking

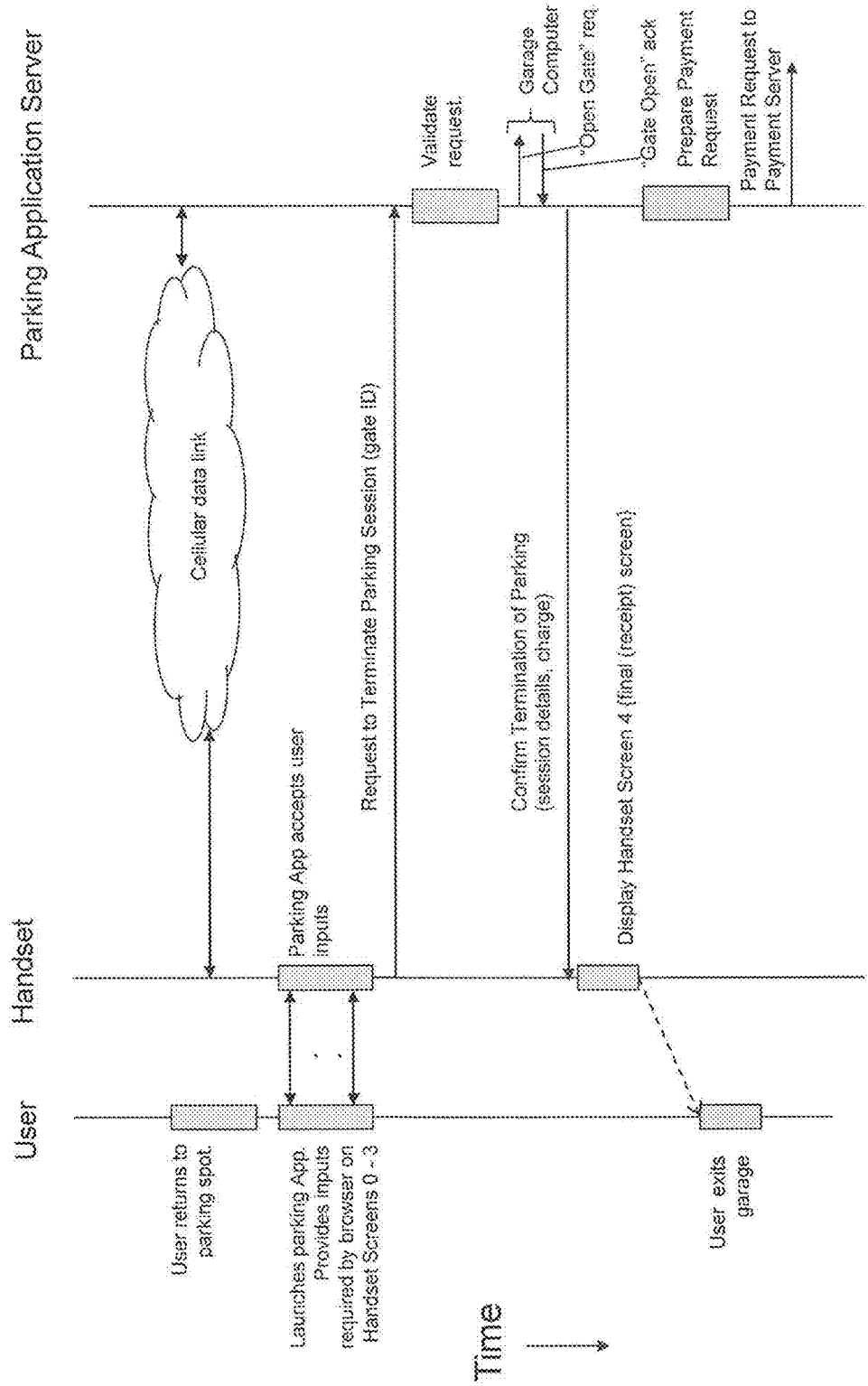

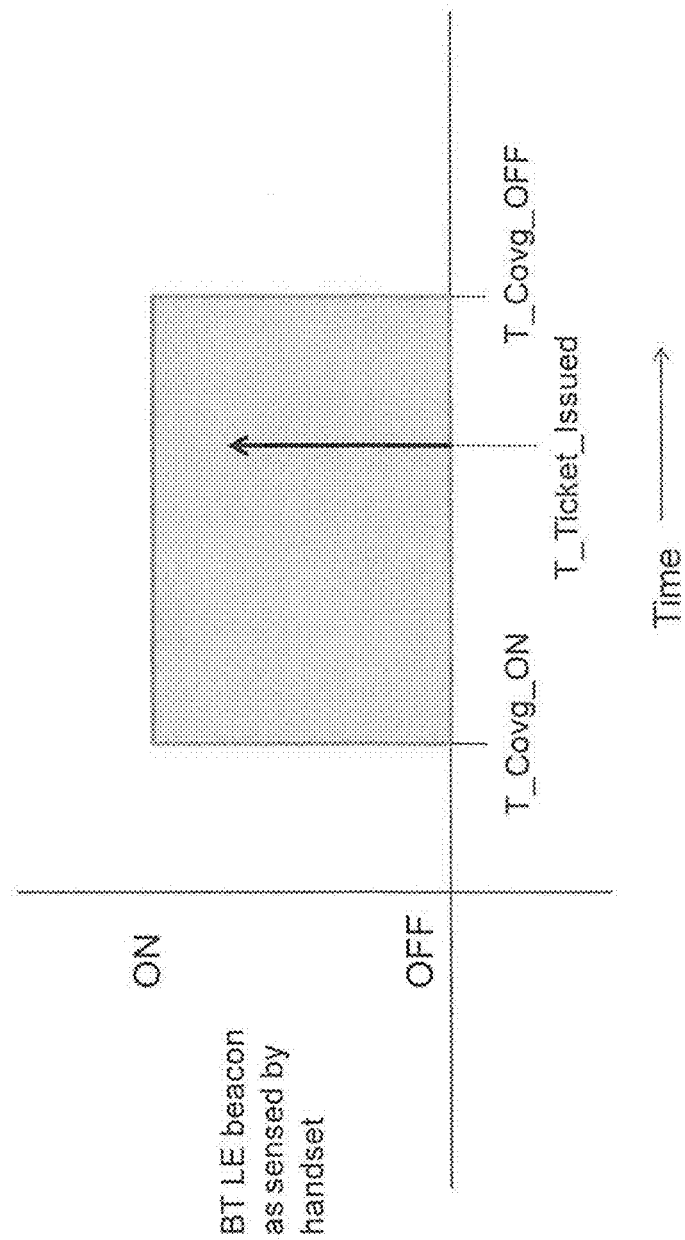

Exemplary Handset screens during Entrance according to an embodiment using paper tickets Exemplary Handset screens during Entrance according to an embodiment using paper tickets Handset Screen 2 or 3

PSP
Garage N
230 N St. NW
Washington DC

Parking Session Status
Started: 2/4/2013 9:35 AM
Present Time: 2/4/2013 9:35 AM
Status: Open Current Charge: $2.50

Exit

End Screen for Entrance. Session Status Screen is displayed

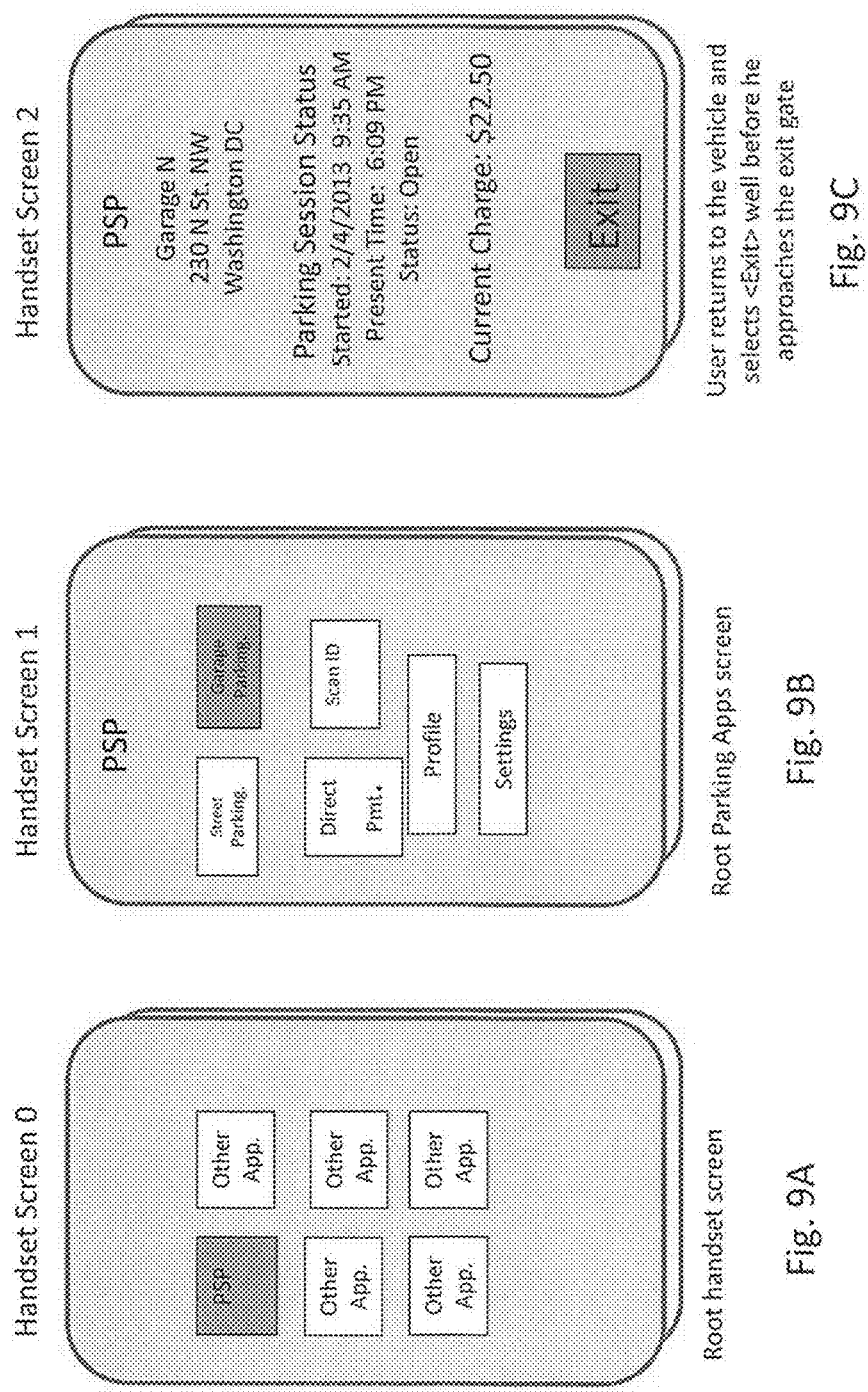

Handset Screen 3

Handset Screen 4

User inserts ticket into reader after he receives this notification

Final (receipt) screen

Exemplary Handset screens during Exit according to an embodiment using paper tickets

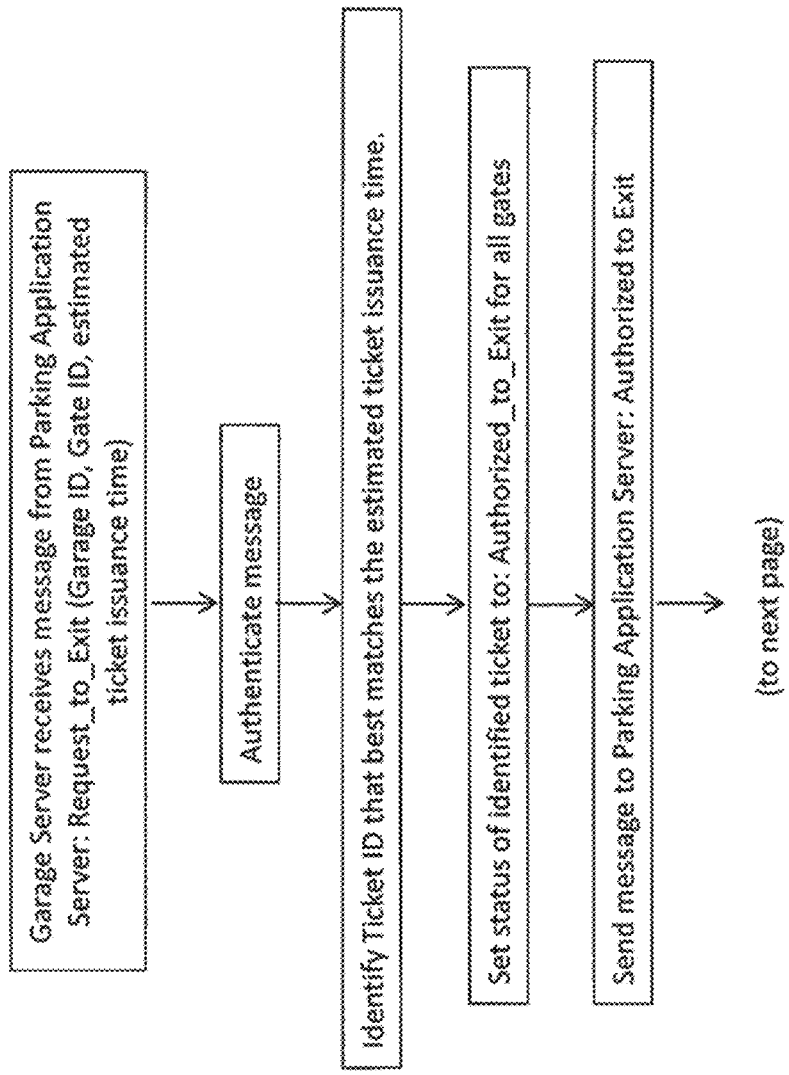

Exemplary Handset screens during Exit transactions according to another embodiment using paper tickets Handset Screen 0

Root handset screen

Handset Screen 1

Root Parking Apps screen

Handset Screen 2

Sensed automatically by BLE beacon at exit gate

User selects <Exit> when he is at the exit gate. He then inserts his ticket into the ticket reader.

Exemplary Handset screens during Exit transactions according to another embodiment using paper tickets

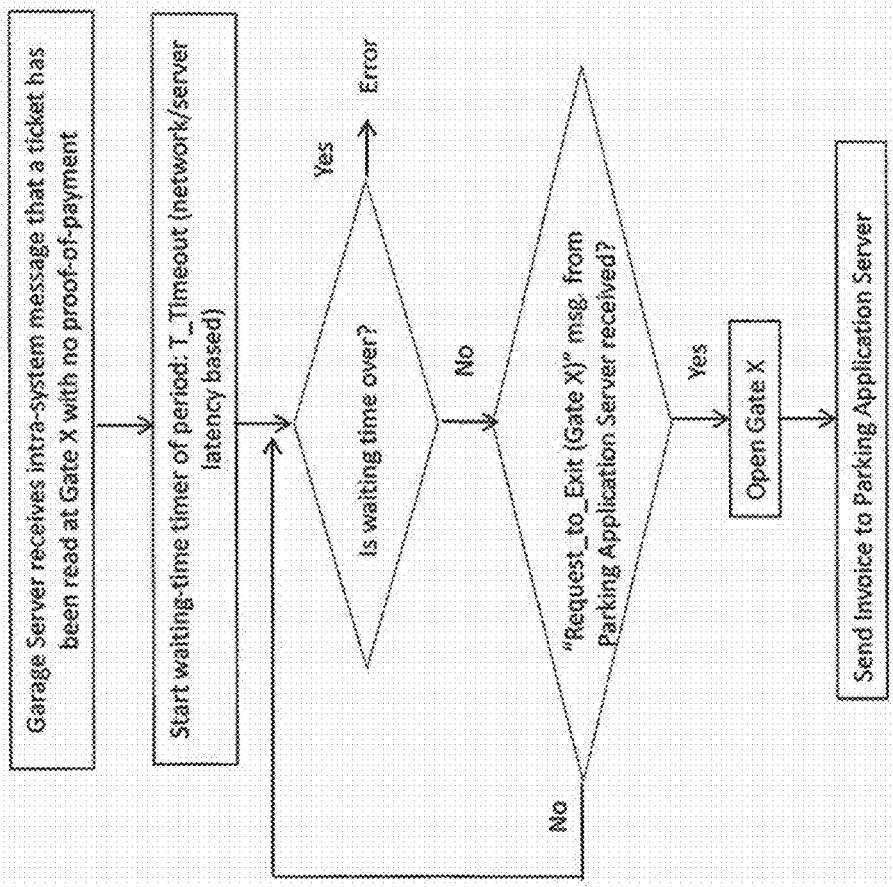

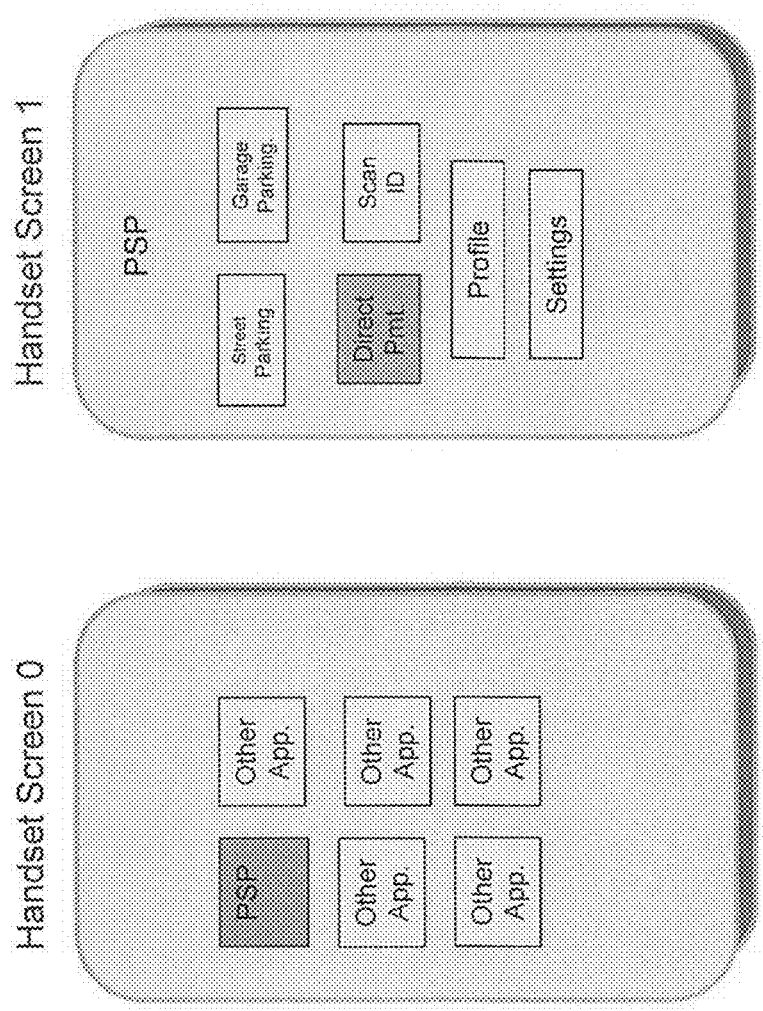

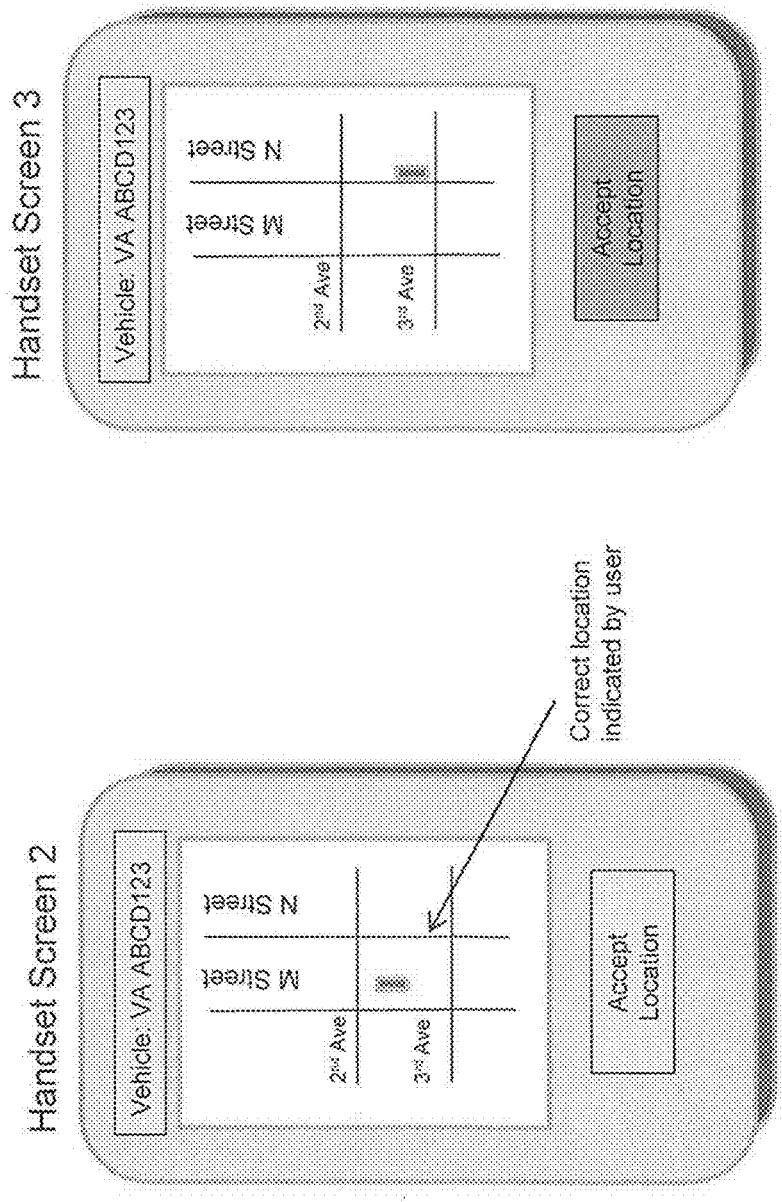

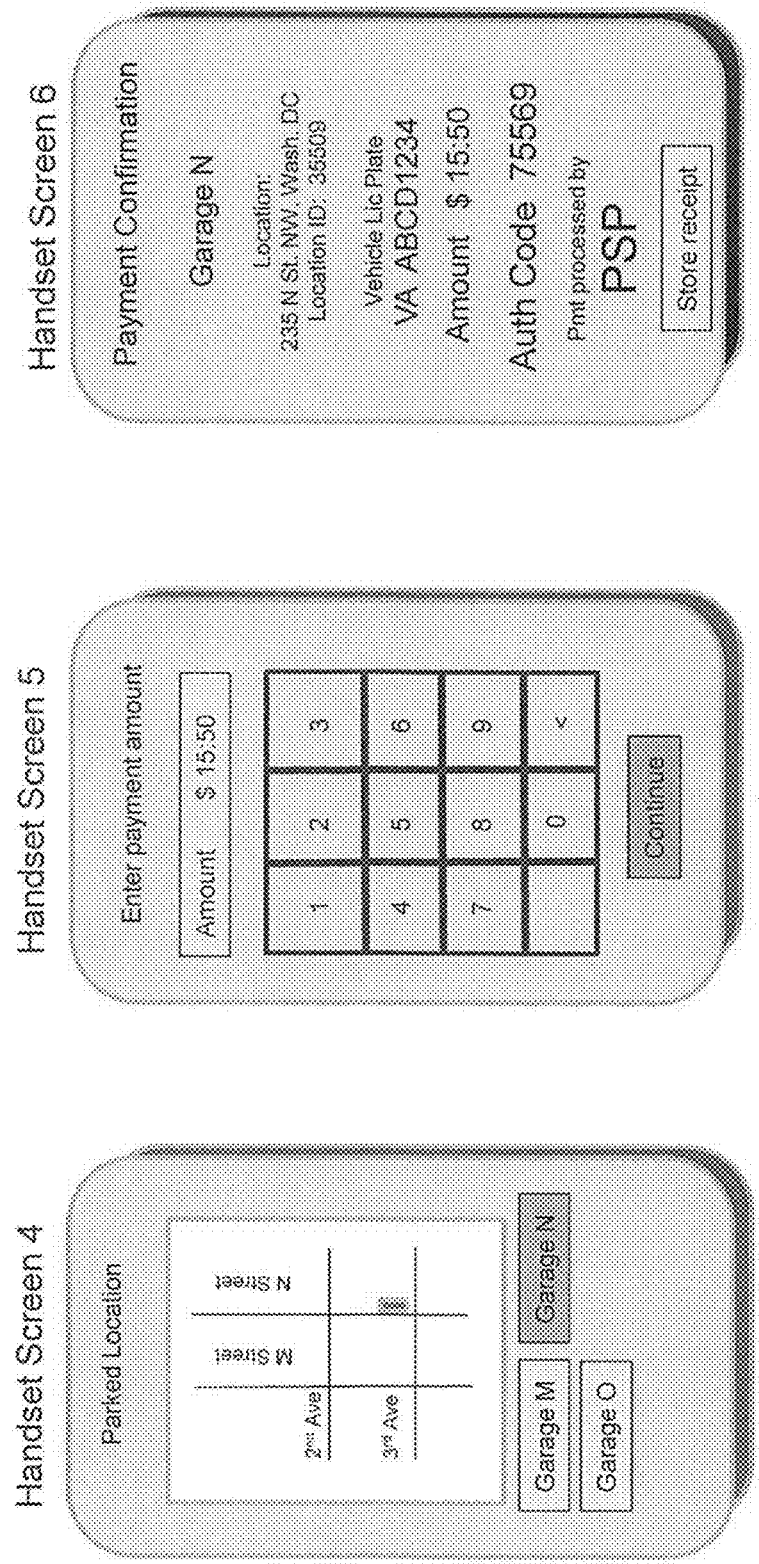

Examples of Handset screens for an embodiment wherein bulletin board information is pushed from a garage server to proximate wireless communications devices Examples of Handset screens for an embodiment wherein bulletin board information is pushed from a garage server to proximate wireless communications devices

METHODS AND SYSTEMS FOR ELECTRONIC PAYMENT FOR PARKING IN GATED GARAGES

RELATED APPLICATIONS

This application is a continuation of U.S. patent application Ser. No. 14/483,218, filed Sep. 11, 2014, which is a continuation-in-part of U.S. patent application Ser. No. 13/862,619, filed Apr. 15, 2013, which claims the benefit of U.S. Provisional Application Ser. No. 61/687,333, filed Apr. 23, 2012, hereby incorporated by reference in their entireties. Ser. No. 14/483,218 also claims the benefit of U.S. Provisional Application Ser. No. 61/880,001, filed Sep. 19, 2013, U.S. Provisional Application Ser. No. 61/888,793, filed Oct. 9, 2013 and U.S. Provisional Application Ser. No. 61/970,161, filed Mar. 25, 2014, hereby incorporated by reference in their entireties.

FIELD OF INVENTION

The invention relates to the fields of wireless mobile commerce, cashless parking and wireless payment for parking, including off-street parking in gated garages.

BACKGROUND

Gated garages refer to garages where access is controlled by a computer or human operator. Such garages are also referred to in this application as closed garages. Gated garages are commonplace as off-street parking facilities in the central business districts of cities. They are also common in airports, hospitals, universities and in many other parking applications.

Typically, payment is made at the time of exit for the actual time parked although, in some cases, a flat fee may be charged at the time of entry for the entire duration of stay. Unlike on-street parking, there is typically no targeted enforcement by a Checker, or Enforcement Officer (EO), while the vehicle is parked. Enforcement takes the form of denial of access (entrance or exit) if payment is not made. There may be some variations to the above use cases.

In order to charge for parking, it is necessary to know when the customer entered and exited the garage. A variety of means are used to determine when a vehicle entered and exited the lot. These may include the user getting a paper ticket with the entry time numerically stamped or bar-coded on to the ticket. The parking fee may be a flat fee or dependent on the time a vehicle spends in the parking lot. The method of payment may be by cash or credit card and may involve a human operating the exit gate and manually validating the paper ticket. Alternatively, the user may pay by credit card at a payment kiosk, which stamps an "authorization to exit" code on the parking ticket, which is valid for a time period that is sufficient to allow the user to exit. The user may exit by presenting the ticket at a gate operated by an automated ticket reader or a human operator. This method is referred to in this application as "paper ticket based method of payment".

There are also prior art, gated parking lots where, at the point of entry, the user is required to swipe a credit card or a special identification (ID) Token issued by the garage. The garage is equipped with a computer that identifies the vehicle by the credit card or the identification token and keeps track of elapsed time until the vehicle exits the garage, at which point, the user swipes the credit card or ID Token a second time. The second swiping causes the garage server to calculate the vehicle's stay duration and accordingly charges the credit card or some other pre-arranged payment system. This method is referred to in this application as "ID Token based method of payment".

The use of payment applications or Apps for gated garages, hosted on wireless communication devices such as Handsets/smartphones or built into vehicles, are rare, although some trials using Near Field Communications (NFC) and optical scanning of codes have been reported.

SUMMARY OF THE INVENTION

The present application teaches methods of paying for parking in a gated garage with an App hosted on a wireless communications device. The embodiments include combinations of the following: authenticating a garage/gate to the wireless communications device; authenticating a wireless communications device to a Garage Server through a Parking Application Server; and linking an issued paper ticket to a wireless communications device in the case where paper tickets are used by a garage.

Embodiments are drawn to methods and systems of payment for parking a vehicle in gated or closed garages using a portable wireless communications device or a wireless communications device built into the vehicle's electronic system including automatically identifying the garage and/or gate to which the wireless communications device is proximate with an RF beacon located at or on the gate. There is no communication link between the RF beacon and a garage server configured to control the gate.

In embodiments of the present invention, the location is automatically sensed by a User Platform, which may be a Handset or equivalent functionality built into a vehicle, the platform using a positioning technology, such as the Global Positioning System (GPS). This location estimate may be augmented by other technologies, such as known locations of WiFi access point, locations of cellular base stations and, in the case where the parking application is built into the electronic system of the vehicle, on-board motion sensors, like inertial navigation systems.

User Correction of Indicated Position

It is well known that, in dense urban canyons, satellite navigation, such as GPS, often provides relatively large position errors owing to limited satellite visibility and multipath propagation. This was recognized in U.S. Pat. Nos. 7,215,255 and 8,140,265, where complex filtering methods were proposed to improve the accuracy; nevertheless, it was admitted that, in spite of such filtering, dependence on motion sensors might be necessary to improve the accuracy. In the embodiments, user inputs are used to correct the indicated position. The user input may be realized though several embodiments.

In one embodiment of user provided correction, a User Platform indicates an estimated position on an electronic map, which position may be corrected by the user based on an awareness of his whereabouts. The user may be aided by the map displaying prominent landmarks and street names. The user may correct the User Platform-indicated position by selecting a position on the displayed map different from and overriding the indicated position. The inputting of an alternate position may be performed by the user touching a touch sensitive display screen, using technologies well known in the prior art.

Another embodiment of user provided correction to a User Platform indicated position, relevant to the case of closed garage parking, is described as follows. The User Platform may indicate an approximate position. If and when necessary, the user may correct the indicated position and cause the User Platform to communicate this to the Parking Application Server, responsive to which, the Server communicates to the User Platform a list of closed garages or garages plus entrances (gates) proximate to the corrected position location. The user selects a garage, or a garage plus gate if one garage has several gates, from the provided list. Alternatively, if the garage does have several gates but a gate number is not indicated in the choice of garages, the user may enter the gate number, posted at the gate, on the User Platform after selecting the garage. This selecting triggers cellular data transactions between the Parking Application Server and a computer or server in the selected garage (Garage Computer or Server), which enables the user to gain access to the garage.

Accessing Closed Garages with Autonomous Position Sensing and Cellular Data Links An aspect of gaining access to closed garages is user/vehicle authentication by the garage infrastructure. Prior art methods exist of performing such authentication using credit cards and RFID. An embodiment of the present invention is drawn to a method of performing the authentication using autonomous position sensing and a cellular or other, wide-area wireless data link. Throughout the narrative of this invention disclosure, wherever cellular wireless technology is referred to, it may be substituted by other wide-area wireless technologies without departing from the teachings of this invention.

In one embodiment, the user approaches a closed garage and launches an App for closed garages on a User Platform, which may comprise a Handset or a subsystem of an in-vehicle electronic system. On a display of the User Platform, the user is shown his own position on a map, which may contain major landmarks to help the user identify his surroundings. The user may choose to correct the indicated position by selecting an alternate position as his true position. This information is uploaded to the Parking Application Server using, for example, a cellular data link. Responsive to the above uploading, the Server downloads a candidate list of proximate closed garages and/or garage gates. When the user is in front of the gate of the garage in which he wishes to park, he selects the garage, or garage plus gate where the garage has multiple gates, on a User Platform display, which may involve touching the display screen at a selected point. If the garage has multiple gates but a gate number ID is not indicated in the list of garages downloaded to the User Platform, a gate number or other ID may also be inputted by the user if the gate number cannot be discerned from the indicated location of the User Platform. This initiates two entrance transactions involving (a) the User Platform and the Parking Application Server, and (b) the Parking Application Server and the Garage Computer. After the user's credentials have been verified, the Parking Application Server requests the Garage Computer to open the gate through an inter-computer handshaking transaction, which ends with an acknowledgment of gate opening being sent from the Garage Computer to the Parking Application Server. Responsive to the receipt of the acknowledgement, the Parking Application Server sends a confirmation message to the User Platform and initiates an active parking session.

At the time of departure, the user approaches the exit gate and launches a garage parking App on his User Platform. If necessary, a gate number is indicated by the user if the gate number cannot be discerned from the indicated location of the User Platform. This causes two exit transactions, similar to the entrance transaction described above, to ensue. After checking the user's credentials, the Parking Application Server requests the Garage Computer to open the exit gate. The Parking Application Server also terminates the parking session.

Another embodiment of closed garage parking is described for a scenario where access to the garage is controlled manually by human operators. The steps are as follows. The user in a vehicle enters such a closed garage and parks at an available spot. In some scenarios, he may be required to pay at the start of the parking session whereas in others, payment may be collected at the end of the session. In legacy systems, payment is made by cash or credit card. In the method/system of the invention, the user launches a payment App, which reports his position, possibly corrected by the user as described above, and also indicating the payment amount. After authenticating the user and processing the payment request, the Parking Application Server sends a payment confirmation comprising at least a common data set to both the user's Handset and a data terminal, such as a cellular Handset or computer terminal with appropriate software, accessible to the garage operators. It is not essential, for the method of this invention to be applicable, that the data terminal should have wireless connectivity, although from a portability perspective this may be desirable. The method of an embodiment is also applicable to a fixed data terminal, such as a computer with wired connectivity to the server. The common data set may contain the vehicle's license plate and a unique authentication code. Other common data, such as the vehicles VIN number and/or an image of the vehicle, may also be supplied. This common data set assures the garage operator that payment has been processed.

The unique authentication code may be made relatively secure by making it difficult to predict, such as by changing the code in a relatively unpredictable way on every transaction with a very long repetition period. Prior art methods of wireless data security may be applied to enhance the security of the transactions performed between the Parking Application Server and the operator's terminal and between the Server and the Handset.

Other embodiments are drawn to methods of integrating a wireless App based payment system to a legacy paper ticket based system in a way that minimizes disruption to the legacy infrastructure, while substantially improving user experience. An aspect of these methods is linking the identity of the issued paper ticket to the user/Handset by either the time of ticket issuance during entry or time of ticket reading during exit. Prior art methods have attempted to perform the same linking by requiring the user to use his Handset to optically scan a barcode on the ticket. This is much more onerous for the user than the methods taught.

Another embodiment is drawn to a method of enabling garages to push real time bulletin board information to potential customers in the vicinity of the garage. This is done by pushing the information to the Parking Application Server and, depending on the latter, to push the information to the users' wireless communications devices when the users open a garage parking App, and thereby report their position to the Parking Application Server. The ability to push information about parking occupancy status, dynamic rates and special promotions to potential customers is without precedence in the parking industry and is expected to provide a major benefit to garage owners.

BRIEF DESCRIPTION OF THE DRAWINGS

FIGS. 1A-1G show exemplary Handset screens for a use case corresponding to initiation of parking, referred to as "Start Parking," in closed garages.

FIG. 1H shows a transaction ladder diagram corresponding to the use case corresponding to initiation of parking, referred to as "Start Parking," in closed garages.

FIGS. 2A-2E show exemplary Handset screens for a use case corresponding to termination of parking, referred to as "End Parking," in closed garages.

FIG. 2F shows a transaction ladder diagram corresponding to the use case corresponding to termination of parking, referred to as "End Parking," in closed garages.

FIG. 7 is a simplified time-events diagram corresponding to the embodiment illustrated in FIG. 5.

FIGS. 9A-9E show exemplary Handset screens during Exit according to an embodiment using paper tickets.

FIGS. 11A and 11B comprise a flow diagram illustrating the Garage Server behavior during Exit transactions according to the embodiment corresponding to FIG. 10.

FIG. 14 is a flow diagram illustrating the Garage Server behavior during Exit transactions according to the embodiment corresponding to FIG. 13.

FIGS. 15A-15G show examples of Handset screens for an embodiment involving direct payment by a user to a garage.

DETAILED DESCRIPTION

Figure 2E:
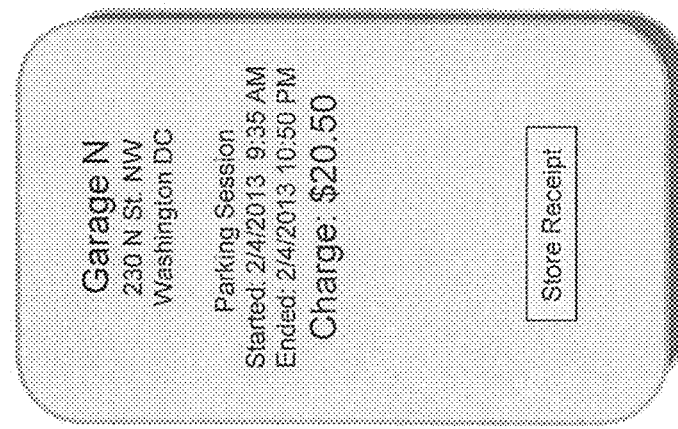
Figure 2D:
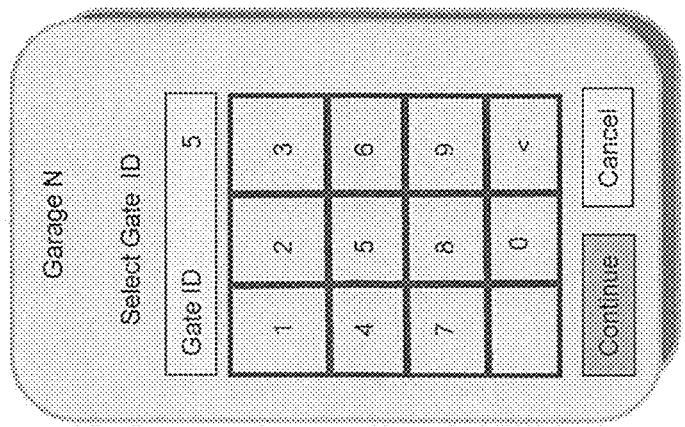

The present invention will now be described more fully hereinafter with reference to the accompanying drawings, in which typical embodiments of the invention are shown. This invention may, however, be embodied in many different forms and should not be construed as limited to the embodiments set forth herein. Rather, these embodiments are provided as examples of how to implement the principles described in this invention.

Glossary of Defined Terms

App—Application software
Checker—An agent of a Parking Authority who is responsible for validating the status (paid/unpaid, expired/unexpired) of a parking session for a given vehicle. The term is used synonymously with Enforcement Officer (EO)

Checking Terminal—A handheld terminal used by the Checker to perform validation of parking sessions, or targeted enforcement, of parked vehicles.

Closed Garage Parking—Parking in areas where the access is controlled by a gate or other barrier.

Enforcement Officer (EO)—used synonymously with Checker

Garage Company—A commercial entity that owns and operates a parking garage and collects fees for its use.

Garage Computer or Server—a computer used by a closed garage to control the entrance and exit gates. The computer is connected to the internet.

Handset—Any wireless device, such as a cellular Handset, smartphone or personal data device, carried by a user and used to access the internet.

ID—Identity

IT—Information Technology

Parking Application Server—A server, operated by the Parking Service Provider, connected to the internet and running parking applications.

Parking Service Provider (PSP)—A service provider providing parking payment and other value added services.

Payment Service Provider—An entity providing payment services to the Parking Service Provider. Examples are VISA®, PayPal®, banks Payment Server—Computing infrastructure of the Payment Service Provider.

RSSI—Received Signal Strength Indicator

User Platform—An electronic system including some or all of the following: positioning location subsystems, cellular radio modems, and radio modems for short range RF technologies such as RFID, where the electronic system supports a parking payment application. Examples are Handset and equivalent functions built into the electronic system of a vehicle.

<.>—Delimiting symbols used to refer to an icon shown on a display screen, such as <Start Parking>.

Detailed Description of Embodiments and Diagrams

The following description uses a Handset to represent User Platform but functions similar to a Handset, built into the electronic system of a vehicle, could perform the same operations and are equally covered by the teachings of this application.

Prior art teaches how short range RF technologies, such as RFID, may be used for authenticating a user directly to a Garage Server for gaining access to closed garages and performing payment transactions based on such authentication. However, RFID is currently neither supported in Handsets nor built into vehicle electronics and may be considered excessively disruptive to their legacy IT infrastructure by some garage owners as it requires wiring the RFID module to the Garage Computer. This application teaches minimally disruptive methods/systems for payment in closed garages using Handset Apps that utilize currently available features of commercially available Handsets. No rewiring of the garage's IT infrastructure is required.

A collection of different embodiments are disclosed that minimize disruption to the existing IT infrastructure of garages wherein the taught methods are affine to different legacy methods of garage parking Specifically, these include ID Token and Paper Ticket based methods, described under Background. Furthermore, affine to each legacy payment method, several alternative embodiments, having different relative advantages, are taught.

Identifying a Garage/Gate for a Parking Payment Transaction in a Closed Garage

An aspect of the new methods, common to both the ID Token affine and Paper Ticket affine methods described here, is authenticating, or identifying, a garage/gate to a User Platform. Two alternative methods are described—based on (a) knowledge of the location of the garage/gate and (b) use of an RF beacon located at the gate of the garage. Both are described below in more detail.

ID Token Affine Payment, Garage/Gate Identified by Autonomous Position Location

FIGS. 1A-1G show exemplary Handset screens for a method/system of payment for closed garages that are affine to legacy ID Token based methods. The above figures illustrate the Start Parking use case; the methods use cellular data links to connect the Handset to the Parking Application Server. As in the other exemplary use cases, FIG. 1A Handset Screen 0 is a root screen and the next screen, FIG. 1B Handset Screen 1, involves selecting the particular parking payment App, <Garage Parking>. Responsive to this selection, the Handset's present location, as determined by the Handset's position location subsystem, is displayed on a map, as in FIG. 1C Handset Screen 2.

It will be noted that the license plate number of the vehicle, also referred to as vehicle ID and exemplified in FIG. 1C as "VA ABCD123", is displayed on Handset Screen 2. This data may be entered into the Handset either manually by the user, as in legacy systems, or automatically via wireless sensing of an identification device in/on the vehicle, as described in U.S. patent application Ser. No. 13/862,619.

The User may accept the position indicated by the Handset's position location subsystem or correct it by touching another location on the displayed map. The user's input is accepted by the parking App and a new location is displayed, as shown on FIG. 1D Handset Screen 3. If the user is satisfied with this location, he selects <Accept Location>.

Responsive to the user selecting <Accept Location>, a message is sent to the Parking Application Server containing the Handset location, as shown on FIG. 1D Handset Screen 3, requesting the Parking Application Server to send information shown in FIG. 1E Handset Screen 4. In this screen, a candidate list of nearby garages are shown, these garages having registered with the Parking Service Provider for the subject payment service. The locations of the garages may be shown on the map of FIG. 1E Handset Screen 4, although not actually shown in FIGS. 1A-1G for simplicity. In some embodiments where the garage has multiple gates, the garage choices shown in FIG. 1E Handset Screen 4 may be associated with gate choices, such as Garage N/Gate X instead of just Gate N. In yet other embodiments, the system may require the user to enter a sign posted gate ID, which is the embodiment described here as an example. The user selects one of the indicated garages and approaches one of its entrance gates.

Responsive to the user selecting one of the garages, such as <Garage N> in FIG. 1E Handset Screen 4, the browser displays FIG. 1F Handset Screen 5, on which the user enters a gate ID, in cases where the selected garage has multiple gates and/or the gate ID cannot be discerned from the user's location and, furthermore, a gate ID was not associated with the garage ID communicated by the Parking Application Server to the Handset. If there is only a single gate, this step is skipped. Knowledge exists in the system (either in the Parking Application Server or in the App in the Handset) of the gate multiplicity of each garage participating in the payment system. In any case, the gate ID may be prominently displayed at the gate. The user enters the gate ID, exemplified by "5" on FIG. 1F Handset Screen 5, and selects <Continue>. This causes a request message to be sent to the Parking Application Server to Start a parking session. The request message contains the garage and gate IDs as fields.

Responsive to the receipt of the request message, the Parking Application Server, after validating the request, sends an Open Gate request to the Garage Computer to open an indicated gate. Responsive to the receipt of the request, and following normal authentication between the servers, the Garage Computer opens the requested gate and sends an Acknowledgement to the Parking Application Server. Responsive to the receipt of the Acknowledgement, the Parking Application Server sends a confirmation message to the Handset containing the data shown on FIG. 1G Handset Screen 6. This is also the Active Session screen, which the user can view remotely at all times (by logging on to the Parking Application Server) at least as long as the session is active.

FIG. 1H shows a time domain, transaction ladder diagram corresponding to the sequence of steps described above and illustrated in FIGS. 1A-1G. In particular, the diagram shows the points in the sequence of steps when over-the-air transactions with the Parking Application Server are required.

FIGS. 2A-2E shows exemplary Handset Screens for the closed garage End Parking use case, corresponding to the closed garage Start Parking use case described above. It will be noted that the transactions for entrance-access and exit-access are similar, with the latter being a reduced subset of the former. The user approaches an exit gate and, on the root screen, FIG. 2A Handset Screen 0, selects the parking App, <PSP>, and on FIG. 2B Handset Screen 1, <Garage Parking>. The Handset App is aware that a session is currently active and, based on this knowledge, opens FIG. 2C Handset Screen 2, which displays the status of the current Active Session. This screen includes an option to close the session, which the user selects by selecting <End Parking>. This causes the browser to open FIG. 2D Handset Screen 3, where the user enters an exit gate ID, in cases where the garage has multiple gates and/or the gate ID cannot be discerned from the user's location. If the garage has a single gate, this step may be skipped. On Handset Screen 3 (FIG. 2D), the user enters the gate ID, exemplified by "5", which is prominently posted near the selected gate, and selects <Continue>, responsive to which a message is sent to the Parking Application Server to close the session and to open the indicated exit gate. Responsive to the receipt of this request, the Parking Application Server sends an "Open Gate" request message to the Garage Computer, indicating the gate ID. After validating the request, the Garage Computer opens the requested gate and sends an Acknowledgement to the Parking Applications Server. Responsive to the receipt of the Acknowledgement, the Parking Application Server sends a confirmation message to the Handset containing the contents of FIG. 2E Handset Screen 4. This screen shows the amount charged and has a button or icon which allows storage of the screen as a receipt in the Handset.

FIG. 2F shows the above steps as a time domain, transaction ladder diagram.

ID Token Affine Payment, Garage/Gate Identified by RF Beacon

Figure 3:
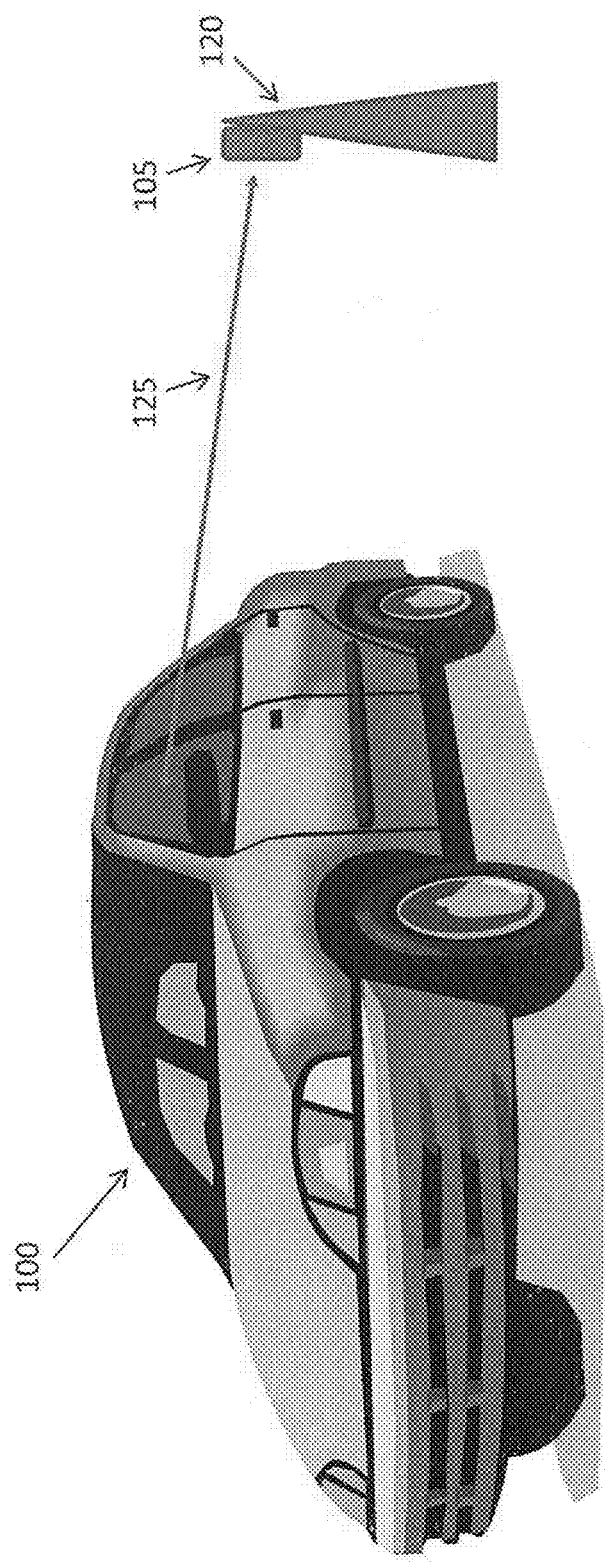
FIG. 3 is a schematic illustration of a parking system and method according to an embodiment wherein a closed garage and gate are identified by a beacon signal to a wireless communications device located in/on a car.

FIG. 3 illustrates an embodiment where a short range radio beacon is used to identify a garage/gate to a Handset. The use of RF beacons for identifying a garage/gate to a Handset is less onerous for the user than the methods of FIGS. 1 and 2 as RF beacons require no user action. The RF beacon methods described here are also superior to the use of RFID as, unlike in the case of RFID, the beacon transmitter does not need to be wired to the Garage Computer; it is therefore less disruptive to the existing Garage infrastructure. If a beacon technology such as Bluetooth® Low Energy (BLE) is used, the transmitter can be powered by a battery with very long life.

FIG. 3 is a schematic illustration of a parking system and method using an RF beacon for identifying a garage/gate. As can be seen in FIG. 3, a vehicle 100 approaches a gate (entrance or exit). A short rage RF beacon transmitter 105 is located at or near the gate. In an embodiment, the short rage RF beacon transmitter 105 is located on a pillar or pylon 120. However, the short rage RF beacon transmitter 105 may be located in any suitable location, such as a wall of the garage. The beacon transmitter 105 uniquely identifies the garage and the gate. The beacon transmitter 105 broadcasts its identity via a signal 125 periodically with a low duty cycle such as 1/s and with low power, providing a coverage range of a few meters. An App on a smartphone or similar device or the vehicle's electronics senses the presence of the beacon transmitter 105 and reads its broadcast identity. For example, using the Bluetooth® Low Energy protocol, this may be performed very rapidly, without the need for elaborate and time consuming pairing protocols used in previous Bluetooth® protocols.

Once the ID of the gate is known to the wireless device, it is used as a part of the payment transaction as described in regards to FIGS. 1A-1H and FIGS. 2A-2F above.

Paper Ticket Affine Systems

The methods of this application teach how to maximally adapt an IT infrastructure designed for paper tickets to Handset Apps, which are much more convenient for the user than using paper tickets. Several embodiments are described, all of which are based on linking the ID of an issued paper ticket to the Handset/user. The link is based on the times of occurrence of events observable to BOTH the handset and the Garage Server, the occurrences being proximate in time.

Paper Ticket Affine System, Linking Ticket ID to User/Handset by Time of Ticket Issuance at Entrance Gate In this embodiment, as in legacy systems, the user enters the gated garage and takes a paper ticket, which causes the gate to open. The user launches the Garage Parking app before he enters the garage. This is a simple step of selecting (touching on a touch sensitive screen) an icon on his handset.

On return to the car, the user opens the currently active parking session by selecting <Garage Parking> on his handset. The user then selects <Exit>. This initiates a payment transaction, which results in an exit request message to be sent to the Parking Application Server, the message containing an estimate of when the ticket was issued to the user (ticket issuance time). Details of how this estimating may be performed are described in subsequent sections. The estimated time of ticket issuance is forwarded by the Parking Application Server to the Garage Server.

In an embodiment alternative to the above, the payment transaction may be performed at the time of entry rather than at the time of exit. According to this embodiment, a message is sent to the Parking Application Server as soon as the user selects <Enter> on his Handset or the BLE infrastructure at the gate determines, automatically, that the user has entered. This embodiment is illustrated by the transaction diagram in FIG. 4, which contains a detailed description of the steps. It is otherwise very similar to the case when the transaction is performed at the time of exit. This embodiment has two advantages relative to initiating the payment transaction at the time of exit—(i) the cellular coverage may be better when the user is about to enter the garage than when he is deep inside it (where his vehicle may be parked and where he starts the App), and (ii) more time is available for the Garage Computer to link the ticket ID to the Handset ID.

Regardless of whether the payment transaction is performed at the time of entry or exit, the ticket issuance time, and hence the ticket ID, is linked to the ID of the Handset used by the user. In this application we sometimes refer to the combination of a particular user and a Handset being used by that user as user/Handset.

The above mentioned linking, performed by the Garage Server, is feasible as the true time of issuance of every ticket is known to the Garage Server. Such knowledge may be gained via the control link connecting the Entrance Access Gate and the Paper Ticket Dispenser to the Garage Server, whereby the Garage Server controls the Access Gate responsive to the user taking a ticket from the Ticket Dispenser. Therefore, a ticket can be identified from the proximity of the estimated ticket issuance time, observed and reported by the Handset to the Parking Application Server, to the true time of ticket issuance.

A number of different methods may be used for estimating the time of ticket issuance, including (i) user provided inputs, and (ii) methods based on proximity sensing using a Bluetooth® Low Energy (BLE) beacon installed close to the Ticket Dispenser.

After identifying the ticket as described above, the Garage Server marks the ticket as "authorized to exit". In the meantime, the user proceeds to the exit gate and presents his ticket to the ticket reader. By the time the user presents the ticket, the necessary transactions between the user's Handset, the Parking Application Server and the Garage Server have been completed.

After the ticket is inserted into the ticket reader at the exit gate, it is almost immediately recognized by the Garage Server as authorized to exit and the gate is opened. The latency of the above process is indistinguishable to the user from legacy practice as the processing necessary to link the Ticket ID to the Handset ID will already have been completed by the Garage Server by the time the user inserts the ticket into the exit gate ticket reader. This is an advantage of the present embodiment over an alternative embodiment, described below, where the Handset ID is linked to the Ticket ID based on the time of ticket reading at the exit gate. An invoice containing the parking session time and charge may be sent by the Garage Server to the Parking Application Server.

Figure 5:
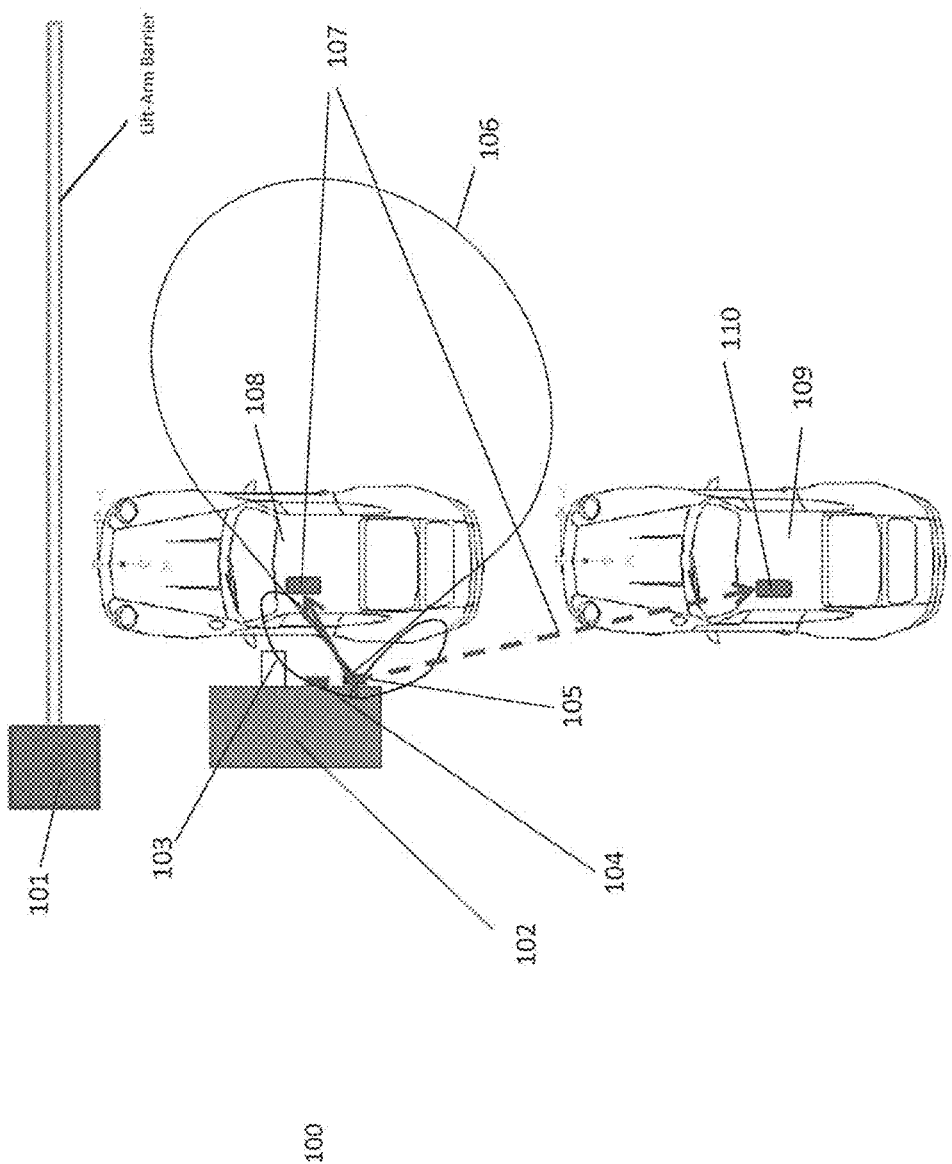
FIG. 5 is a schematic illustration of the infrastructure at a garage entrance gate according to an embodiment involving integration with a paper ticket based system.

Detailed Process Description (Linking Ticket ID to Handset ID Based on Time of Ticket Issuance During Entry): Start Parking FIG. 5 shows a plan view of a typical infrastructure set up at the entrance gate of a Gated Garage, 100. Variations from this particular set up are possible without departing from the concepts taught here. The garage is equipped with an Entrance Access Gate 101, featuring a Lift-Arm Barrier or other suitable barrier. Just before Gate 101, is a Paper Ticket Dispenser 102, also referred to as ticket issuer, which issues a Paper Ticket 103, when the user presses the Paper Ticket Dispensing Switch 104. When the user pulls out the issued ticket from the Paper Ticket Dispenser 102, the barrier in Gate 101 is lifted and the user may enter the garage.

A short range wireless technology, such as BLE, provides a beacon signal whose coverage, or transmitted power flux density, is focused, that is maximal, near the point of ticket issuance. A BLE Beacon module 105 is mounted on the Paper Ticket Dispenser 102 such that the main lobe of the Radiation Pattern 106 of the BLE Module is pointed at the car that is immediately next to the Paper Ticket Dispenser 102. Other methods of mounting the BLE module can achieve the same objective.

The direct, radiowave propagation path from the BLE Module to a Handset 107 in the $1^{st}$ car 108 corresponding to the main lobe of the beacon antenna pattern is shown as a solid arrow. A Handset 110 in a $2^{nd}$ car 109 that is next in line may receive a signal from a sidelobe of the beacon radiation pattern and is shown as a dotted arrow. The antenna pattern of the BLE Module should be designed such that sufficient suppression is provided to the sidelobe path relative to the mainlobe path so that the level of its reception by Handset 110 is relatively small for a constant (static) BLE transmit power. In typical patch antennas, it is not difficult to obtain 15-20 dB sidelobe discrimination.

The transmit power of the BLE Module 110 may be set (in a static, non-power-controlled mode) at a level such that the $1^{st}$ car 108 will receive a signal that will be above the Handset's threshold level for coverage with very high probability while the probability of the Handset's threshold being exceeded in the $2^{nd}$ car 109 will be relatively low. This may be determined by known propagation analyses methods. The Bluetooth® protocol allows RSSI to be read [BT version 1.1]. Provided the beacon transmitter is at a constant power level, i.e. not subject to dynamic power control, the RSSI value may be used to determine the point at which the handset is closest to the beacon module.

Alternatively, the BLE protocol may be operated with dynamic power control but using the Transmit Power Service (TPS) of the BLE standard, which reports the beacon's transmit power to the handset. This may be used to determine the point at which the handset is closest to the beacon module as the transmit power will then be close to minimum.

The BLE protocol has an Advertising mode in which the beacon transmits a short message, referred to as an Announcement in this specification, at a radio frequency that is adjustable and known to the receiver. This message may be repeated at other radio frequencies also known to the receiver in the Handset. The beacon transmitter's and the Handset-receiver's radio frequencies hop synchronously in accordance with the rules of the BLE protocol. Owing to frequency hopping, the effect of multipath in causing variability in the received signal level is mitigated—this means that when a handset is in the main lobe of the radiation pattern of the BLE Module 105, it is highly likely to receive the Announcement at least on some of the broadcast frequencies, even if propagation nulls exist at some of the frequencies.

Figure 8A:
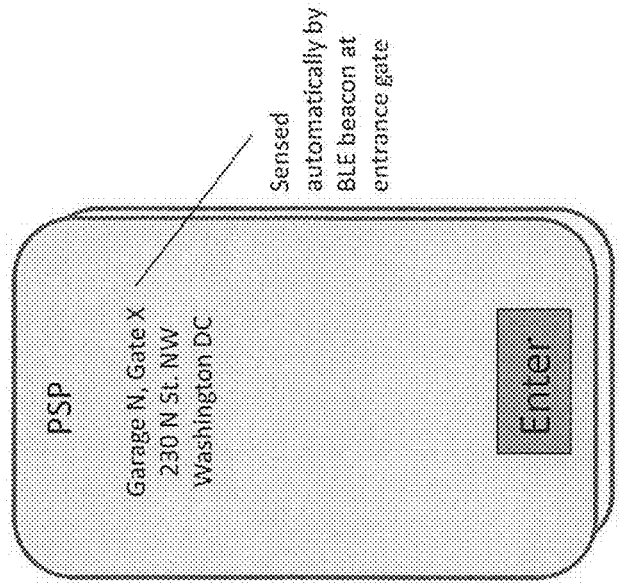
FIGS. 8A-8D show exemplary Handset screens during Entrance according to an embodiment using paper tickets.
Figure 8B:
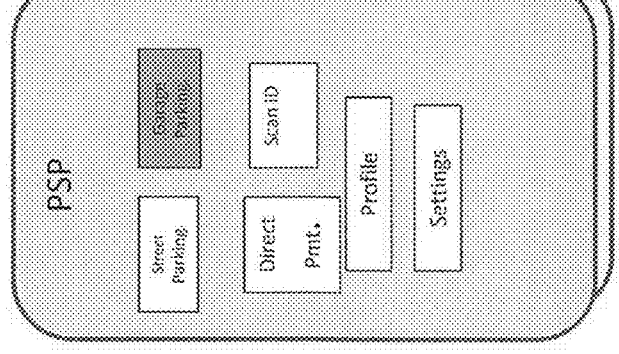
Figure 8C:
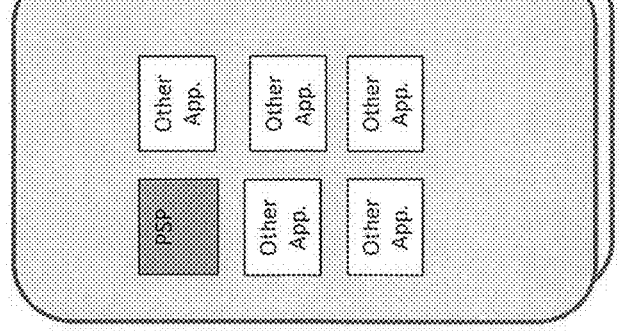
Figure 8D:
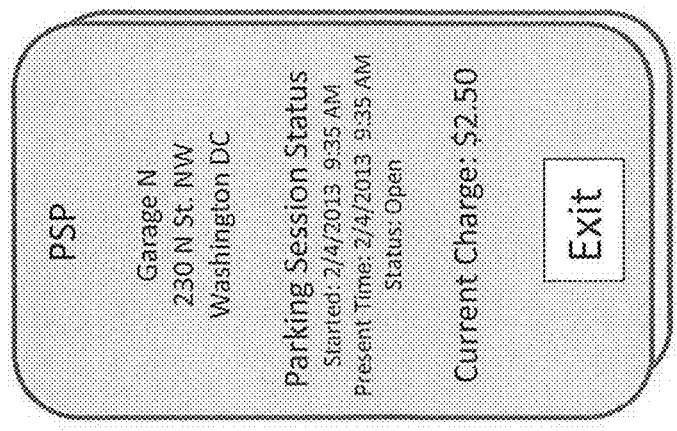

In an embodiment, the user actions as he enters the garage are as follows. The user drives up to the entrance gate with the Bluetooth® (BT) functionality on his Handset (which supports BLE) turned on. He launches the Garage Parking App on his handset at some time before he approaches the entrance gate. To minimize the probability of false reception of an Announcement, either from a sidelobe of the BLE Beacon Module 105 or from other BLE transmitters in the environment, it is preferable that the user launches the App when he is at (next to) the Paper Ticket Dispenser 102. However, the user experience may be better (less onerous) if the user is allowed the freedom to launch the App at a time of his choosing (but before the ticket is issued). This can be enabled by adding an <Enter> step in the sequence of handset screens shown in FIG. 8C. Then, the user can launch the App by executing the steps in Handset Screen 0 and 1 (FIGS. 8A and 8B, respectively) at a time of his choosing. The user selects <Enter> in Handset Screen 2 (FIG. 8C) when he is at the paper ticket dispenser and there is no other user between him and the ticket dispenser.

The Gate ID, which is used in the payment transaction, can be sensed automatically from a BLE beacon or entered manually by the user (not shown in the example Handset screens). The BLE beacon may be the same as used for determining the time of ticket issuance, as described above. However, this is not essential for implementing the teachings described here. For example, a separate beacon, with a broad antenna pattern, may be located near the entrance gate to identify the garage/gate to passing vehicles, and another beacon with lower transmit power and a more focused antenna pattern may be dedicated to the task of determining the time of ticket issuance. Furthermore, identifying the garage/gate may be performed by means other than a radio beacon, e.g. by means of autonomous position location, as described here as an alternative embodiment. Even legacy methods of garage/gate identification, such as manual entry of the garage/gate ID on to the Handset, may be used while still using the new methods taught here for identifying an issued ticket with a Handset App.

As discussed above, as an alternative to a user provided input, the time of ticket issuance can be sensed from the BLE signals received by the handset. This relieves the user of the need to provide any input beyond launching the Garage Parking app at time of his choosing (at some time before he arrives at the entrance gate). This embodiment of the method is described below detail.

Figure 6:
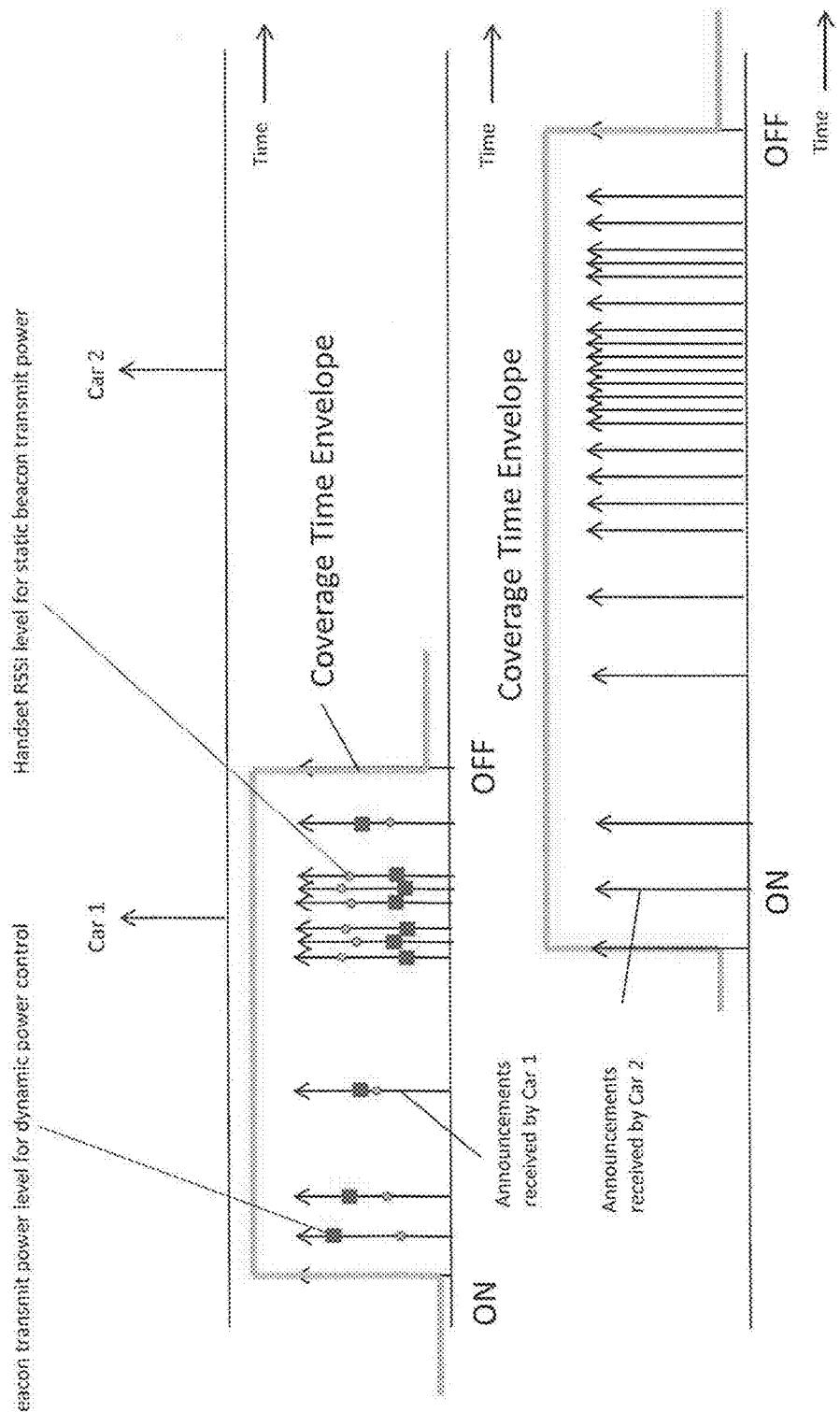
FIG. 6 is a time-signal diagram illustrating an embodiment using a Bluetooth® Low Energy beacon proximate to the ticket dispenser.

The user's handset senses the BLE beacon when it gets within the latter's coverage. After the successful receipt of the first Announcement, which is a defined message broadcast unilaterally and periodically by the BLE Module, a short data exchange occurs between Handset 107 and BLE Module 105, whereby the IDs of the Garage and the Gate are communicated to the Handset (in the case where the BLE transmitter is also used for garage/gate identification). Then, the user takes the paper ticket from the gate 101, which causes the gate to open. The user drives the vehicle past the gate area and enters the garage. This causes the handset to go out of coverage of the beacon. FIGS. 6 and 7 show the timelines of key events as the user enters the garage.

FIG. 6 shows details of the receipt of Announcements in the time domain. As noted in the diagram, some Announcements may be missed owing to a combination of low antenna gain and multipath propagation. However, close to the BLE Module (such as within 1 m), essentially all Announcements are expected to be received with very high probability. Examples of the RSSI level read by the handset (in the case of static beacon transmit power) and the beacon's transmit power level (in the case of dynamic power control) are show in FIG. 6.

FIG. 7 is a simplified version of FIG. 6, showing the key events of the car getting in and out of BLE coverage, designated T_Covg_ON and T_Covg_OFF, respectively. Here, T_Covg_ON is the first point in time when an Announcement was received by the Handset with a received power sufficient to be recognizable by the Handset as a valid Announcement. T_Covg_OFF is the last point in time when an Announcement was received by the Handset with a received power sufficient to be recognizable by the Handset as a valid Announcement signal. The actual time of ticket issuance is designated T_Ticket_Issued and is communicated to the Garage Computer without using the wireless communications device, for example, through a control link between the Garage Computer and the gate.

As explained above, the present embodiment of the method estimates the time of ticket issuance and links it to the Handset. A requirement feature of this embodiment is that the estimated ticket issuance time be closer to the true ticket issuance time for a particular user than the true ticket issuance time to any other user. This may be achieved by the following alternate methods:

i. The user provides an input on his Handset, which may comprise launching an App or providing some other input with the App already launched.

ii Methods based on proximity sensing using BLE (details described above and illustrated in FIGS. 5-7). These methods may use the following techniques singly or in combination.

a. In processing the time series of Announcements received by the handset, the ticket issuance event is linked with the time when RSSI level (in the case of static beacon transmit power), averaged over some number of Announcements, is at its maximum value, or the beacon's transmit power level (in the case of dynamic power control), averaged over some number of Announcements, is at its minimum value.

b. In processing the time series of Announcements received by the handset, the true ticket issuance time T_Ticket_Issued is linked to T_Covg_OFF in FIG. 7. It is preferable to link T_Ticket_Issued to T_Covg_OFF rather than T_Covg_ON because there is likely to be greater uncertainty with the latter parameters. This is because it is more likely that the user has to wait longer before he approaches the ticket dispenser than the time spent in the vicinity of the dispenser after the ticket is issued. FIG. 6 shows an example where multiple T_Ticket_Issued events could exist inside a Coverage Time Envelope if the BLE Module's antenna pattern discrimination is insufficient. This is more likely to occur when the beacon uses dynamic transmit power control. In such cases, the last T_Ticket_Issued event inside a given Coverage Envelope is likely to be the correct one and is so linked when T_Covg_OFF is used as the estimated value of the ticket issuance time.

An advantage of embodiment (i) over (ii) is that in (i) there is no dependence on the characteristics of radio frequency coverage which is subject to variations. In (i), if the BLE module is used at all, its purpose is only to communicate the Garage/Gate IDs. However, as described above, (ii) is less onerous for the user and therefore offers superior user experience.

In at least one legacy system, the linkage between the user/Handset and the ticket ID is established by optically scanning a ticket barcode and uploading the barcode information to the Parking Application Server and forwarding the same to the Garage Server. In the system of the present embodiment, it is not necessary for the user to scan the ticket or go through the steps of uploading the information to a server.

After entering the garage, the user may park his car and leave. Besides launching the Garage Parking App on his handset before entering the garage, no other changes are required to the user's usual behavior relative to legacy systems.

Figure 4:
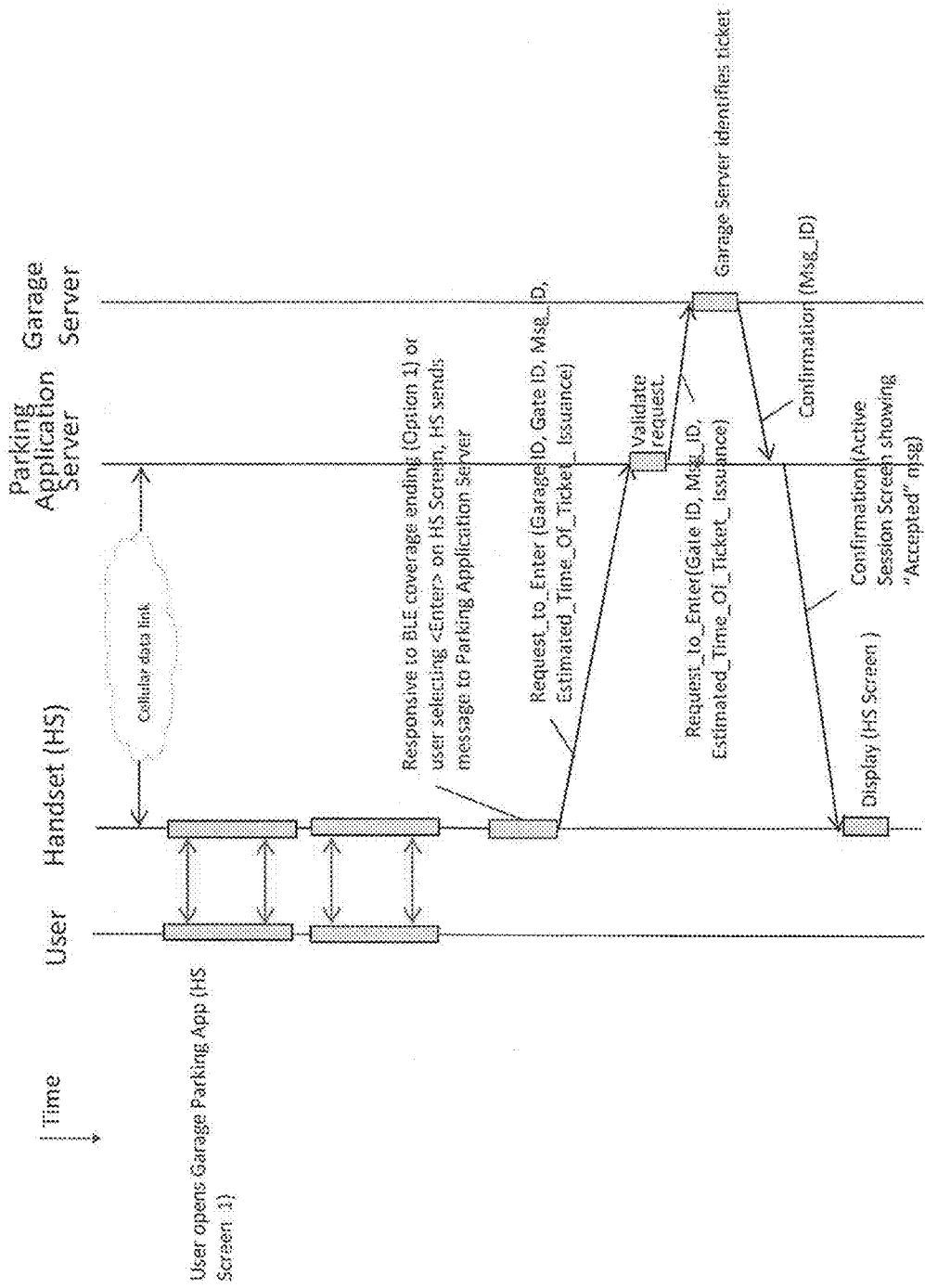
FIG. 4 is a transaction ladder diagram corresponding to an embodiment involving integration with a paper ticket based system.

In one embodiment, the linking between the ticket ID and the Handset ID is performed at the time of entry, as shown by the transaction diagram of FIG. 4. Here, as soon as the user ticket issuance time is estimated by the Handset, either by method (i) or (ii) above, the Handset sends a Request_to_Enter message to the Parking Application Server containing: estimated ticket issuance time, the garage ID, gate ID and a Message ID. The latter links the Handset ID to the estimated ticket issuance time. The Parking Application Server uses the garage ID information to determine which Garage Server to direct the transaction to. It forwards the other contents of the message to the Garage Server, as shown in FIG. 4. The Garage Server links the Message ID to a ticket ID in the server's database. The linking is performed on the basis of time proximity between (a) the actual ticket issuance time, which is known to the Garage Server and is linked to a ticket ID, and (b) the estimated ticket issuance time reported by the Parking Application Server and linked to a Message ID. When the linking has been completed, the Garage server sends a confirmation message containing the Message ID, shown as Confirmation (Msg_ID) in FIG. 4. This informs the Parking Application Server that the linking of the ticket ID and the Message ID has been successfully completed by the Garage Server, and that the user will be allowed to exit when he presents his ticket to the ticket reader at any exit gate. The Parking Application server may convey this confirmation to the Handset in a message.

Figure 10:
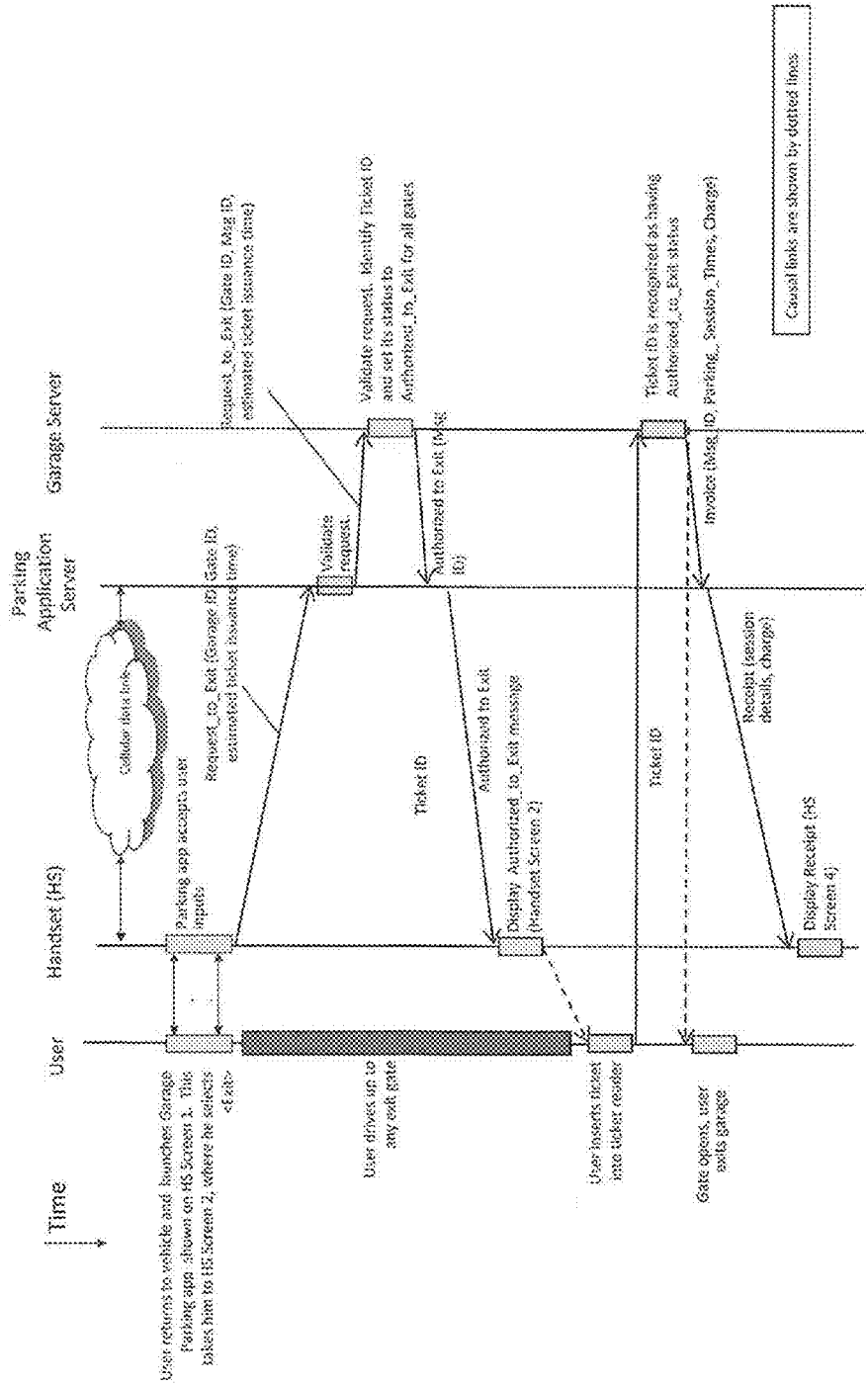
FIG. 10 shows a transaction ladder diagram for an Exit transaction according to an embodiment corresponding to FIGS. 9A-9E.

At the time of exit, the process is similar to legacy systems, wherein the ticket may be cleared for exit by payment at a kiosk or a credit card transaction at the gate. In addition, the Garage Server will determine the parking session details, including the charge and forward it to the Parking Application Server, which may forward it to the Handset. The steps of the exit transactions (after the user enters his ticket into the ticket reader) are not shown in FIG. 4—they are identical to those of the alternate embodiment shown in FIG. 10.

In an alternate embodiment, as mentioned above, the linking between the ticket ID and the Handset ID is performed at the time of exit, that is, at the time that the parking session ends. This is described below in detail.

Detailed Process Description (Linking Ticket ID to Handset ID Based on Time of Ticket Issuance During Entry): End Parking The method of this embodiment is described with the help of example Handset screens shown in FIGS. 9A-9E and the transaction diagram in FIG. 10.

On the return of the user to the car, well before he approaches the exit gate, the user launches the Garage Parking App on his handset, as shown on Handset Screens 0 and 1 in FIGS. 9A, 9B. This takes him directly to the Active Session screen, shown as Handset Screen 2, FIG. 9C. Here he selects <Exit>. This sends a message to the Parking Application Server that the user is ready to leave.

The message contains the Garage ID and the entrance Gate ID as fields. Until this time, the Parking Application Server was unaware that the user had parked his car at a gated garage, unless an information exchange had occurred with Parking Application Server as described above. The Garage ID tells the Parking Application Server which Garage Server to talk to. Then, the Gate ID is forwarded to the Garage Server to enable it to identify the ticket ID by the method of time association described above.

The exit request message is forward by the Parking Application Server to the Garage Server after deleting the Garage ID and adding a Message ID (Msg_ID) field. The Message ID is a proxy for the user/handset ID as the Parking Application Server would normally be processing many requests at the same time. The Garage Server invoices the Parking Application Server based on the Message ID.

In the method of this embodiment, the user can use any exit gate, so no exit Gate ID needs to be specified in the exit request message from the Parking Application Server.

Figure 11B:
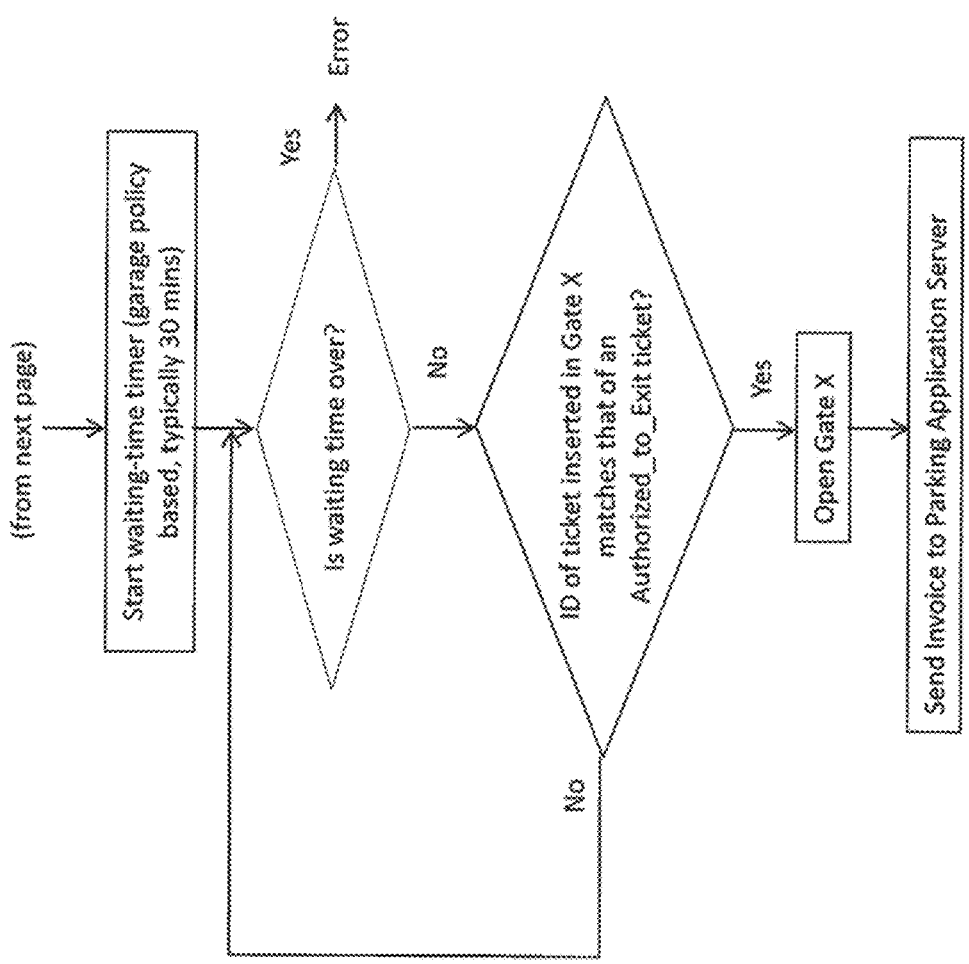

Detailed Process Description (Linking Ticket ID to Handset ID Based in Time of Ticket Issuance During Entry): Garage Server Operation The Garage Server Operation is illustrated with the help of Handset Screens in FIGS. 9A-9E, transaction diagram in FIG. 10 and Garage Server Behavior flow diagram in FIGS. 11A and 11B.

Figure 9D:
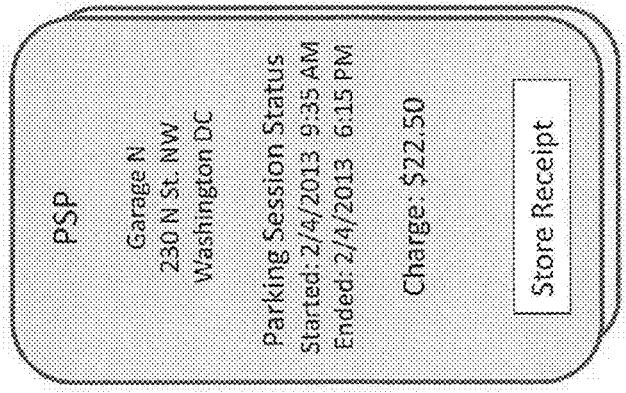
Figure 9E:
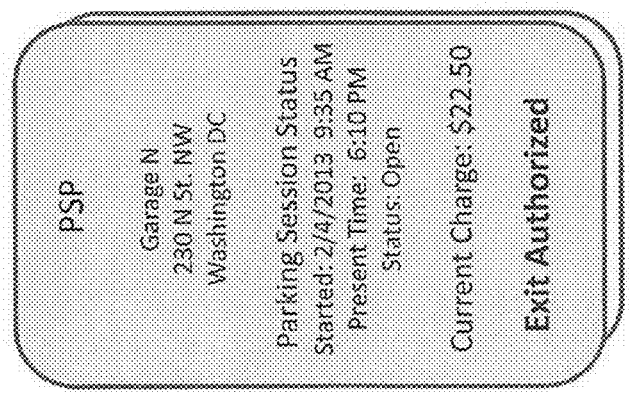

After identifying the correct ticket ID in its database, based on estimated ticket issuance time information received from the Parking Application Server, the Garage Server sends an Authorized to Exit message back to the Parking Application Server, which forwards it to the handset, as shown in FIG. 9D (Handset Screen 3). Receipt of this screen provides confirmation to the user that he is authorized to exit. Within a fixed time period of receiving the above confirmation, set by garage policy (e.g. 30 minutes), the user presents the paper ticket to an exit gate ticket reader; this causes the exit gate to open. This mirrors the legacy practice of allowing a fixed time window for the user to exit after completing a kiosk payment. When the user presents the ticket at a ticket reader, the Ticket ID is conveyed to the Garage Server via the garage's own IT infrastructure. If the server recognizes the ID as one whose status has been set to Authorized_to_Exit, it opens the exit gate and sends an Invoice (containing the parking session time and charge, referenced to a Message ID) to the Parking Application Server. Based on this input the Parking Application Server builds the Receipt and sends it to the user's handset.

Paper Ticket Affine System, Linking Ticket ID to User/Handset by Time of Ticket Reading at Exit Gate In this embodiment of the methods, the IDs of the paper ticket issued to the user and his Handset are linked based on the time that the ticket is inserted into the ticket reader at the exit gate. Unlike the alternate embodiment based on time of ticket issuance, here the user does not need to launch the Garage Parking App at all until returning to the car. When the user is at the exit gate, he provides an input to the handset, which may comprise launching the Garage Parking App, or selecting <Exit> on the handset screen with the App already launched (at any time before the user arrives at the gate). As in the previous embodiment, BLE proximity sensing may also be used as a substitute for a user provided input.

The user input (or BLE proximity sensing) causes an exit request message to be sent from the Handset to the Parking Application Server. The message contains the Gate ID as a field, which may have been sensed automatically by a BLE beacon at the exit gate or entered manually by the user.

After providing the above input (if required), the user enters his ticket into the ticket reader and waits for the gate to open. The Garage Server receives two inputs—(i) the ID of the ticket entered by the user into the ticket reader, and (ii) an exit request message from the Parking Application Server (containing the Gate ID and a Message ID linked to the handset/user ID). Information (i) and (ii) may be received in any sequence, including (i) before (ii), owing to network and server latencies causing greater latency to (ii) than the intra-system latency internal to the garage IT infrastructure.

Provided both (i) and (ii) have been received within a preset time-out period, the Garage Server, after authenticating the exit request message, opens the gate indicated in the exit request message. The Garage Server also links the ID of the ticket entered into the ticket reader to the ID of the exit request message, which can be traced back to user/Handset by the Parking Application Server. The Garage Server sends an acknowledgement message to the Parking Application Server, referencing the Message ID and invoicing it for the parking session. The Parking Application Server links the Message ID to the user/Handset ID and sends the user's Handset a receipt with the session details, including the charge.

Unlike an ID Token method, in neither of the above embodiments is the parking session time known to the Parking Application Server until it receives the invoice message from the Garage Server. In the first paper ticket embodiment, the entrance time is known approximately to the Parking Application Server but the exit time is not known. In second paper ticket embodiment, the exit time is known approximately but the entrance time is not known. In the ID Token method, both the entrance and exit times are known to the Parking Application Server as it provides the necessary authentication on occasions.

Detailed Process Description (Paper Ticket Affine System, Linking Ticket ID to User/Handset by Time of Ticket Reading at Exit Gate)

A detailed description is provided below for the embodiment where the paper token method is being used but the ticket reading time at the exit is the controlling time parameter for linking the ticket and the user/Handset ID.

The parking session begins in the same manner as the legacy practice. That is, the user takes a ticket from the ticket dispenser at the entrance gate in the usual way, parks his car and leaves.

BLE infrastructure may be installed at the entrance gate to inform the handset of the Garage ID (and possibly Gate ID, if the ticket IDs are not unique between the different gates of a garage).

Figure 12A:
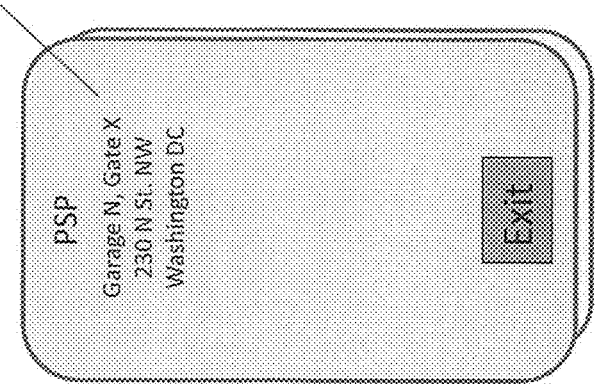
FIGS. 12A-12D show exemplary Handset screens during Exit transactions according to another embodiment using paper tickets.
Figure 12B:
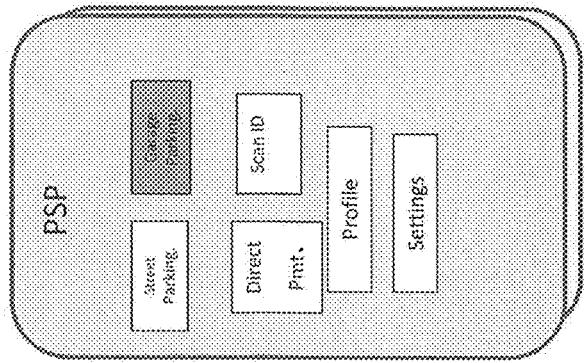

On return, the user drives up to the gate and, when it is clear that the previous user has left (gate opened), he launches the <Garage Parking> app on his handset and selects <Exit>. This is illustrated by Handset Screens 0 to 2 on FIGS. 12A-12C. Alternatively, the user could pre-launch the Garage Parking app at a time of his choosing (by executing the steps in Handset Screens 0 and 1) but execute the step in Handset Screen 2 only when he is near the ticket reader, as described above.

Figure 12C:
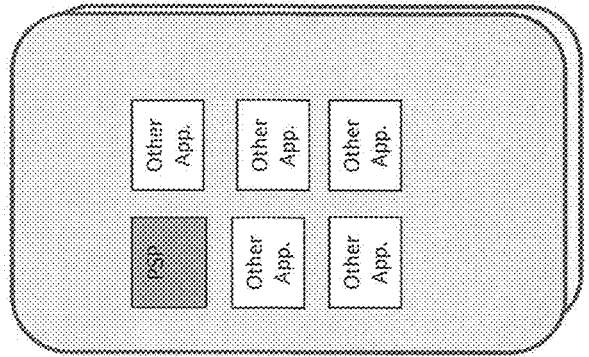
Figure 12D:
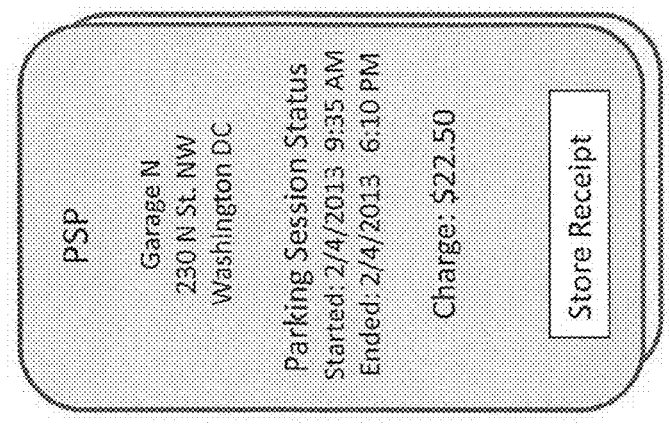

In either of the above scenarios, the user enters the Gate ID on his handset (not shown in the examples in FIGS. 12A-12C) or a BLE beacon will sense it automatically when he is near the gate, as shown by Handset Screen 2 in FIG. 12C.

Figure 13:
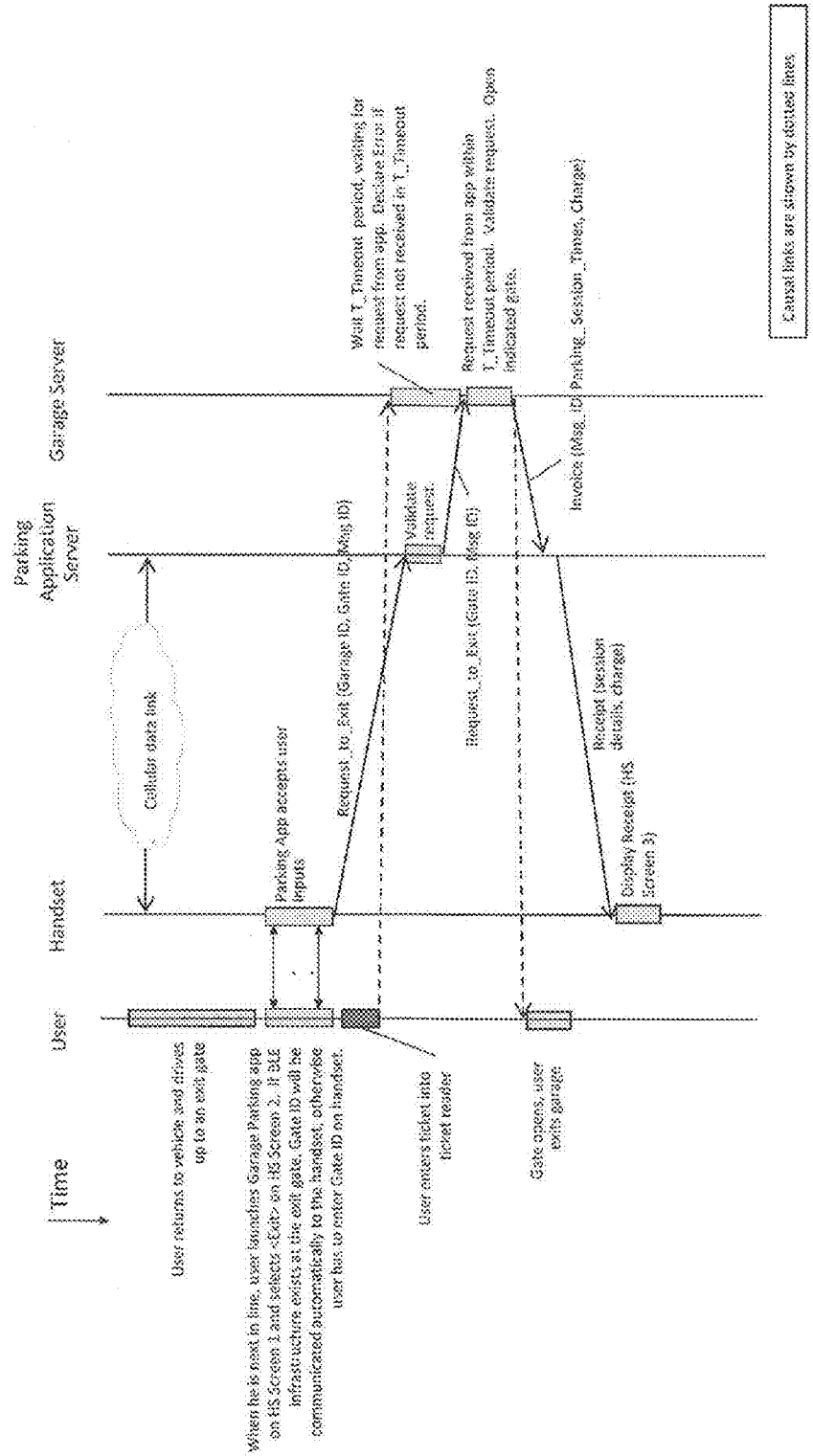
FIG. 13 shows a transaction ladder diagram for Exit transactions according to the embodiment corresponding to FIG. 12A-12D.

After launching the App, the user enters the ticket into the ticket reader and waits for the gate to open. The insertion of the ticket into the ticket reader causes an intra-Garage-system message to be transmitted from the ticket reader to the Garage Server containing the ticket ID. This should take very little time as it is a local network. On receipt of this message, unless the ticket is recognized as having been paid for by legacy means, the Garage Server starts a counter which waits for T_Timeout period. During this time the Garage Server expects to receive a Request_to_Exit (Gate ID, Msg_ID) message from the Parking Application Server as illustrated in the transaction ladder diagram of FIG. 13 and the Garage Computer flow diagram of FIG. 14.

On receipt, the message is first authenticated by the Garage Server. This ensures that it is from a trusted Payment Service Provider. If T_Timeout has not expired, the Garage server will open the gate. Otherwise, an error condition will be flagged. T_time_out has to be sufficiently long to allow for worst case network and server delays, as well as allowing a reasonable time period between the user selecting <Exit> and entering the ticket into the ticket reader.

The sequence of the user selecting <Exit> and inserting the ticket into the ticket reader may be reversed with no material consequence to the concept of operation.

As shown in FIG. 14, after the gate has been opened, the Garage Server sends an invoice message, Invoice (Msg_ID, Parking_Session_Times, Charge) to the Parking Application Server, indicating the session details referenced by Msg_ID. The Parking Application Server builds a Receipt, containing the session details and the charge, for the appropriate user and sends it to his handset.

It may be noted that both embodiments of the paper ticket methods are much simpler for the user than the legacy kiosk method, which involves: (i) finding a payment kiosk and possibly waiting in line to access the kiosk; (ii) inserting the paper ticket into the kiosk; (iii) paying with cash or credit card; (iii) collecting the returned paper ticket from the kiosk and presenting to a reader it at an exit gate.

Direct Payment to a Garage

FIGS. 15A-15G show exemplary Handset Screens for an embodiment where the user makes a direct payment to a human operator of a closed garage. Here, "direct" means that the payment amount is not determined by a server but input directly by the user, perhaps on advisement by a garage employee. The Handset Screens may be adapted to vehicle display screens when the Handset functionality is built into a vehicle. Such embodiments are equally covered by this invention, although the present example describes an embodiment where the User Platform is a Handset. Many closed garages either lack the infrastructure for computer controlled access or have an overriding need for manual control of entrance and exit access, such as in valet parked garages. In all such cases, the user's payment experience can be made more *facile* and secure by the use of wireless payment, as described herein.

FIG. 15A Handset Screen 0 is the root screen. In FIG. 15B Handset Screen 1, the user selects <Direct Payment>. This leads to FIG. 15C Handset Screen 2, where an approximate user location is indicated by the Handset's position location subsystem. The user may accept this location or correct it as shown in FIG. 15D Handset Screen 3. As in the case of Garage Computer controlled closed garage access (Start Parking), described above, this leads to a cellular data transaction with the Parking Application Server, which sends a set of candidate garages. The set may have only one member if there is little uncertainty about which garage the user is in or about to enter. The user selecting the correct garage, such as by selecting <Garage N> in FIG. 15E Handset Screen 4, leads to FIG. 15F Handset Screen 5, where he enters the payment amount, exemplified by $15.50 in the present case, and selects <Continue>. This causes a message to be sent to the Parking Application Server, using a cellular data link, indicating the garage ID and the payment amount. The Parking Application Server validates the request and sends confirmation messages to both the user's Handset and a data terminal connected to the internet and used by a garage operator. The confirmation messages contain some common elements. The data terminal may be a commercial smartphone with appropriate application software. An example of a confirmation screen is shown in FIG. 15G Handset Screen 6. A common element of the confirmation messages, referred to above, may comprise an authentication code, "AUTH CODE", exemplified by "75569", which is designed to be difficult to predict, such as by changing it in a relatively unpredictable way for every transaction, with a sufficiently long repetition period to minimize the risk of fraud. The user shows his Handset Screen 6 to the garage operator. If the AUTH CODE on the user's Handset screen matches the one received by the garage operator's terminal, the operator is assured that payment has been processed. This prompts him to allow the user exit or entrance access, based on whether payment is required as the time of exit or entry, respectively.

An additional common element of the messages may comprise vehicle attributes, such as the license plate number and/or an image of the vehicle. This may add confidence to the payment transaction from the perspective of the garage operator. It may be desirable to further minimize security risk by securing the wireless data links involved in the transactions using prior art technologies.

While the above embodiment describes, as an example, autonomous position location by a Handset as the basis of determining the garage/gate ID, the alternate embodiment taught here—use of an RF beacon—is equally applicable for this purpose. Even methods prior art methods, such as manually entering the garage/gate ID, may be used without detracting from the essential features of this payment method.

Pushing Garage Bulletin Board Information to Handsets

In one embodiment, independent of the method of payment, responsive to the receipt of garage/gate ID information by the Handset, a wireless data exchange may be performed between the Parking Application Server and the Handset, whereby bulletin board type data about a particular garage or a set of garages may be communicated to the handset. This may include, but is not limited to: current space availability at the garage; current parking rates which may be adjusted dynamically in response to present occupancy; special rates for times of expected low occupancy; others. The information may be time varying—updated at a frequency chosen by the garage. This capability may provide a substantial benefit for the garage owner, providing him a competitive advantage over other garages in the neighborhood.

Figure 16B:
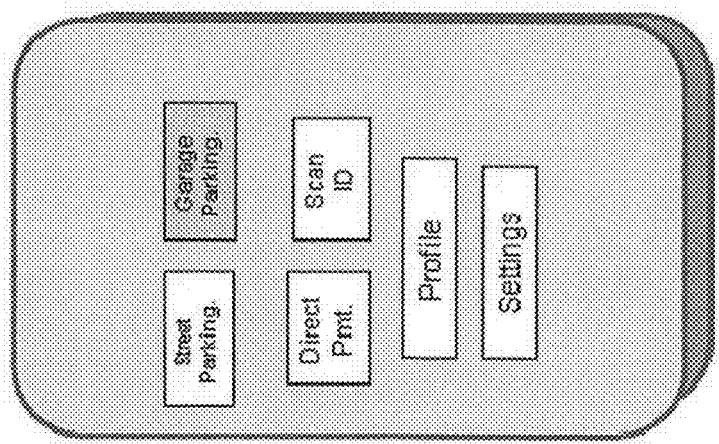
FIGS. 16A-16D show examples of Handset screens for an embodiment wherein bulletin board information is pushed from a garage server to proximate wireless communications devices.
Figure 16A:
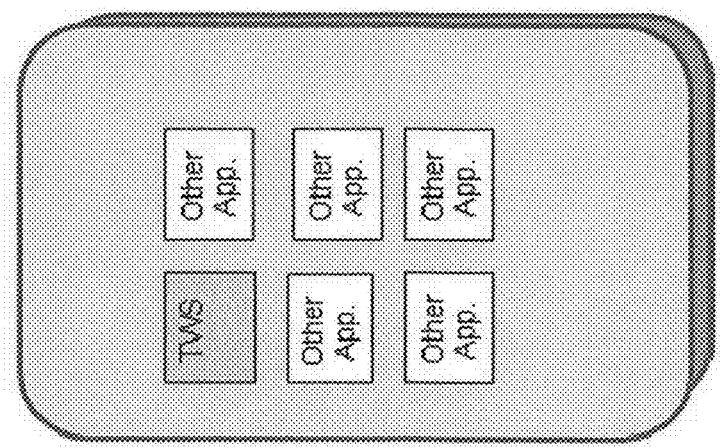

FIGS. 16A-16D illustrate Handset screens that illustrate the use case. FIG. 16A shows the Handset root screen and FIG. 16B shows the parking App root screen. Here, when the user selects <Garage Parking> in Handset Screen 1, the Handset becomes aware of the IDs of one or more proximate garages and displays them as shown, as an example, FIG. 16C Handset Screen 2. This awareness may be acquired by one of the methods described here, such as autonomous position sensing by the Handset or by means of a radio beacon located at one of the garage/gates. Bulletin board information about the IDs of proximate garages are communicated by the Parking Application Server to the Handset, responsive to the Handset uploading to the server information about its present location or the ID of an RF beacon to which it is proximate. The beacon ID is mapped by the Parking Application Server to a known location.

Figure 16C:
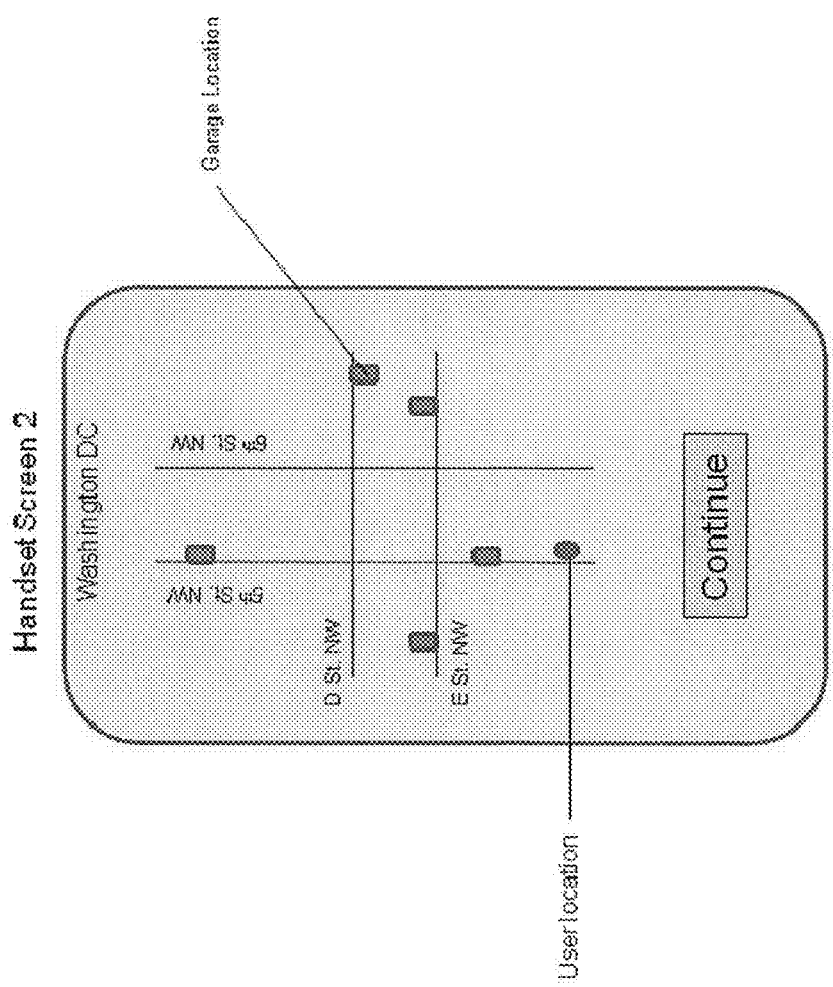
Figure 16D:
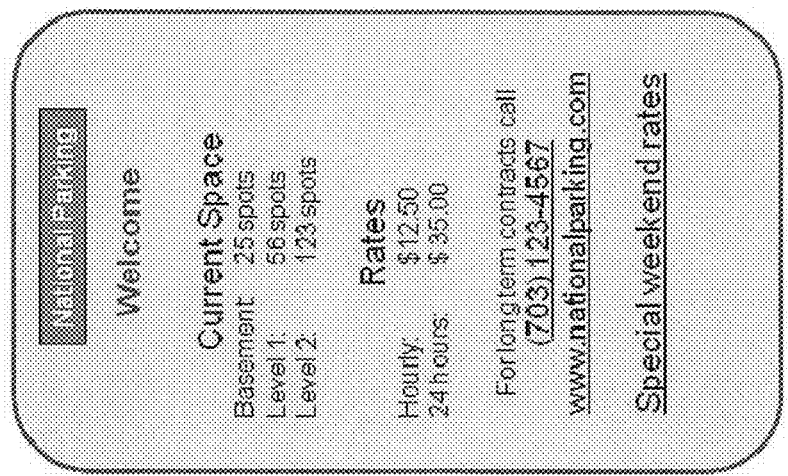

The bulletin board information is communicated to the Parking Application Server by the computers of garages with which it has a prearranged business relationship, such as providing parking payment service The user may view the bulletin board by clicking on one of the icons, representing different garages, shown on FIG. 16C. An example of a bulletin board is shown in FIG. 16D.

The above method may be applied more generally to many other applications, the common core requirements being:

there is an establishment, such as a garage, which wishes to share time varying bulletin board type information with potential customers in the vicinity of the garage, the time variability being chosen by the establishment;

an establishment server is able to share the bulletin board information with a server owned and operated by a service provider, an example of the latter server being a Parking Application Server;

potential customers of the establishment have accessible to them wireless communications devices which are operably connected to the service provider server;

while availing of location based services, such as parking payment applications, the wireless communications devices communicate their locations to the service provider server;

the service provider server sends bulletin information of nearby establishments to the wireless communications devices.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of payment for parking a vehicle in garages using a wireless data communications device comprising:
receiving, by a parking application server, from the wireless data communications device, a first data message, the first data message comprising multiple data fields comprising a garage ID and a gate ID of a selected garage and a selected gate;
authenticating, by the parking application server, the wireless data communications device;
extracting, by the parking application server, the gate ID from the first data message;
sending, by the parking application server, to a garage computer associated with the selected garage a second data message, the second data message comprising:
the extracted gate ID and an identification of the wireless communications device;
a request to open the selected gate of the selected garage; and
a request to start a parking session corresponding to the wireless communications device;
receiving, by the parking application server, from the garage computer, an end of parking session message; and
paying for the parking session, by the parking application server, in response to receiving the end of parking session message.

2. The method of claim 1, further comprising:
receiving by the parking application server, from the wireless data communications device, a third data message, the third data message comprising a request to end the parking session and an exit gate ID; and
sending by the parking application server to the gate computer, a fourth data message, the fourth data message comprising:
the gate exit ID; and
a request to open an exit gate associated with the exit gate ID.

3. A method of payment for parking a vehicle by a user in gated or closed garages using a portable wireless communications device or a wireless communications device built into the vehicle's electronic system, the wireless communications device comprising a microprocessor, a display and a wireless communications transceiver, the method comprising:
selecting a gated or closed garage where the vehicle is to be parked and, if the garage has multiple gates, the gate by which the garage is to be entered, and then approaching the selected garage and gate;
when the vehicle is within two meters of the selected gate, automatically determining with the wireless communications device the identities of the gated or closed garage and, if the garage has multiple gates, a gate to which the wireless communications device is within two meters, where the automatic identification of the garage and the gate is performed with a short range RF beacon signal which transmits, from a beacon transmitter, an identification identifying the garage and, if the garage has multiple gates, the gate, and the transmission is received by the portable wireless communications device or the wireless communication device built into the vehicle's electronic system, the identification being received by the wireless communications device only when the wireless communications device is adjacent a main lobe of the beacon transmitter and the identification information is communicated to a parking application server via the wireless communications device, wherein there is no communication link between the beacon transmitter and a garage computer configured to control the gate,
wirelessly communicating information from the wireless communications device to the parking application server about the selected garage, including the gate if the garage has multiple gates, the information being incorporated in a request message to enter the garage by the selected gate;
the parking application server authenticating the wireless communications device based on an identification of the wireless communications device and forwarding a request to a garage computer corresponding to the garage selected, to open a specified gate and to start a parking session;
the garage computer responding to the request from the parking application server by authenticating the parking application server and opening the requested gate and starting the parking session; and
at the end of the particular parking session, the parking application server paying for parking for the particular parking session based on elapsed time and the identifications of the garage the entered and the wireless communications device.

4. The method of claim 3, further comprising the beacon transmitter operating the beacon in a low energy advertising mode.

5. The method of claim 3, wherein the short range RF beacon signal transmitter radiates signal power through a main lobe of a radiation pattern that is pointed at a vehicle immediately adjacent to the beacon transmitter.

6. A garage parking system comprising:
at least one gate located at a garage;
a garage computer associated with the garage and configured to open the gate; and
a parking application server comprising:
a processor configured with software instructions to perform operations comprising:

receiving from a wireless communications device, a first data message, the first data message comprising multiple fields comprising a garage ID and a gate ID of a selected garage and a selected gate;

authenticating the wireless communications device based on an identification of the wireless communications device;

extracting the gate ID from the first data message;

forwarding a second data message, in response to the authentication, to a garage computer corresponding to the selected garage, the second data message comprising:

the extracted gate ID and the identification of the wireless communications device;

a request to open the selected gate to the selected garage; and a request to start a parking session for the wireless communications device; and paying for parking for the particular session, at the end of the parking session, based on the elapsed time and the identities of the garage and the wireless communications device.

7. A garage parking system for a vehicle comprising:

at least one gate located at a garage;

a beacon transmitter located proximal to the gate, the beacon transmitter having a broadcast range of two meters;

a garage computer associated with the garage and configured to open the gate; and a parking application server comprising:

a processor configured to perform the following steps:

receiving from a wireless communications device, a first data message, the first data message comprising multiple fields comprising a garage ID and a gate ID, the garage ID and the gate ID automatically determined when the vehicle is within two meters of the beacon transmitter associated with a selected gate of a selected garage;

authenticating the wireless communication device and establishing an identification for the wireless communications device;

extracting the gate ID from the first data message;

forwarding a second data message, in response to the authentication, to a garage computer corresponding to the selected garage, the second data message comprising:

the extracted gate ID and the identification of the wireless communications device;

a request to open the selected gate; and a request to start a parking session linked to the identification of the wireless device; and paying for parking for the particular session, at the end of the parking session, based on the elapsed time and the identities of the garage and the wireless communications device.

* * * * *